US011169241B2

United States Patent
Zhang et al.

(10) Patent No.: US 11,169,241 B2
(45) Date of Patent: Nov. 9, 2021

(54) SENSOR AND CONTROL METHOD THEREOF

(71) Applicant: SUZHOU JSOLAR INCORPORATED, Jiangsu (CN)

(72) Inventors: Min Zhang, Suzhou (CN); Qiudong Shi, Suzhou (CN); Chao Zhu, Suzhou (CN); Xiaokang Kang, Suzhou (CN)

(73) Assignee: SUZHOU JSOLAR INCORPORATED, Suzhou (CN)

( * ) Notice: Subject to any disclaimer, the term of this patent is extended or adjusted under 35 U.S.C. 154(b) by 154 days.

(21) Appl. No.: 16/434,126

(22) Filed: Jun. 6, 2019

(65) Prior Publication Data
US 2019/0285720 A1    Sep. 19, 2019

Related U.S. Application Data

(63) Continuation of application No. PCT/CN2016/113880, filed on Dec. 30, 2016.

(30) Foreign Application Priority Data

Dec. 8, 2016   (CN) .......................... 201611119751.0

(51) Int. Cl.
*G01J 1/20*   (2006.01)
*G01S 3/786*   (2006.01)
(Continued)

(52) U.S. Cl.
CPC ............ *G01S 3/7861* (2013.01); *G01B 11/26* (2013.01); *G01C 1/00* (2013.01); *G01J 1/0271* (2013.01);
(Continued)

(58) Field of Classification Search
CPC ...... G01J 1/0407; G01J 1/4228; G01J 1/0271; H02S 20/32; G01C 1/00; G01B 11/26; G01S 3/7861; H01R 13/5205
(Continued)

(56) References Cited

U.S. PATENT DOCUMENTS 4,383,129 A * 5/1983 Gupta .................. C08F 265/06
                                                       136/251
5,128,659 A * 7/1992 Roberts .............. G02B 27/0101
                                                       340/980
(Continued)

FOREIGN PATENT DOCUMENTS

CN       101320138 A       12/2008
CN       203745910 U       7/2014
(Continued)

OTHER PUBLICATIONS

International Search Report in PCT/CN2016/113880 dated Sep. 6, 2017, 7 pages.
(Continued)

*Primary Examiner* — Georgia Y Epps
*Assistant Examiner* — Kevin Wyatt
(74) *Attorney, Agent, or Firm* — Metis IP LLC

(57) ABSTRACT

The present disclosure disclosures a sensor and a control method of the sensor. The sensor may include a protective housing, an optical component, a control component, an interface component, and a circuit board mounted within the protective housing. The circuit board may include a plurality of detection components, including a photosensitive detection component and a tilt angle detection component. The control method of the sensor may include determining whether the photovoltaic module operates in an angle detection range of the photosensitive detection component, and determining whether an actuation condition of the photo-
(Continued)

sensitive detection component is satisfied. In response to a determination that the actuation condition of the photosensitive detection component is satisfied, the photosensitive detection component may be actuated. In response to a determination that the actuation condition of the photosensitive detection component is not satisfied, the tilt angle detection component may be actuated.

18 Claims, 10 Drawing Sheets

(51) Int. Cl.
*H02S 20/32* (2014.01)
*G01B 11/26* (2006.01)
*G01J 1/02* (2006.01)
*H01R 13/52* (2006.01)
*G01J 1/42* (2006.01)
*G01C 1/00* (2006.01)
*G01J 1/04* (2006.01)

(52) U.S. Cl.
CPC ............ *G01J 1/0407* (2013.01); *G01J 1/4228* (2013.01); *H01R 13/5205* (2013.01); *H02S 20/32* (2014.12); *G01J 2001/4285* (2013.01)

(58) Field of Classification Search
USPC ............................................ 250/203.4, 203.1
See application file for complete search history.

(56) References Cited

U.S. PATENT DOCUMENTS

| | | | | | |
|---|---|---|---|---|---|
| 6,392,223 | B1* | 5/2002 | Hjertman | ................. | G01C 9/10 250/221 |
| 6,472,864 | B1* | 10/2002 | Emo | ........................ | G01C 9/06 200/61.45 R |
| 8,056,247 | B2* | 11/2011 | Lai | ........................... | G01C 9/10 33/366.23 |
| 9,839,267 | B1* | 12/2017 | Gharabegian | ........... | G06F 3/167 |
| 2010/0000104 | A1* | 1/2010 | Mollmer | .................. | G01C 9/10 33/365 |
| 2010/0309330 | A1* | 12/2010 | Beck | ....................... | G01W 1/10 348/222.1 |
| 2012/0048340 | A1 | 3/2012 | Qadir | | |
| 2012/0309230 | A1* | 12/2012 | Watanabe | .............. | H01R 24/44 439/620.21 |
| 2013/0006435 | A1* | 1/2013 | Berrios | ................... | H02S 20/32 700/295 |
| 2014/0083480 | A1* | 3/2014 | Gerwing | ................. | F24S 40/85 136/246 |
| 2016/0097638 | A1* | 4/2016 | Fedigan | ................... | G01C 9/06 324/71.1 |

FOREIGN PATENT DOCUMENTS

| | | |
|---|---|---|
| CN | 204065839 U | 12/2014 |
| CN | 104391511 A | 3/2015 |
| CN | 205540298 U | 8/2016 |
| CN | 206208390 U | 5/2017 |
| JP | 2004191244 A | 7/2004 |
| WO | 2008022474 A1 | 2/2008 |

OTHER PUBLICATIONS

Written Opinion in PCT/CN2016/113880 dated Sep. 6, 2017, 8 pages.
First Office Action in Chinese Application No. 201611119751.0 dated Sep. 1, 2017, 8 pages.

* cited by examiner

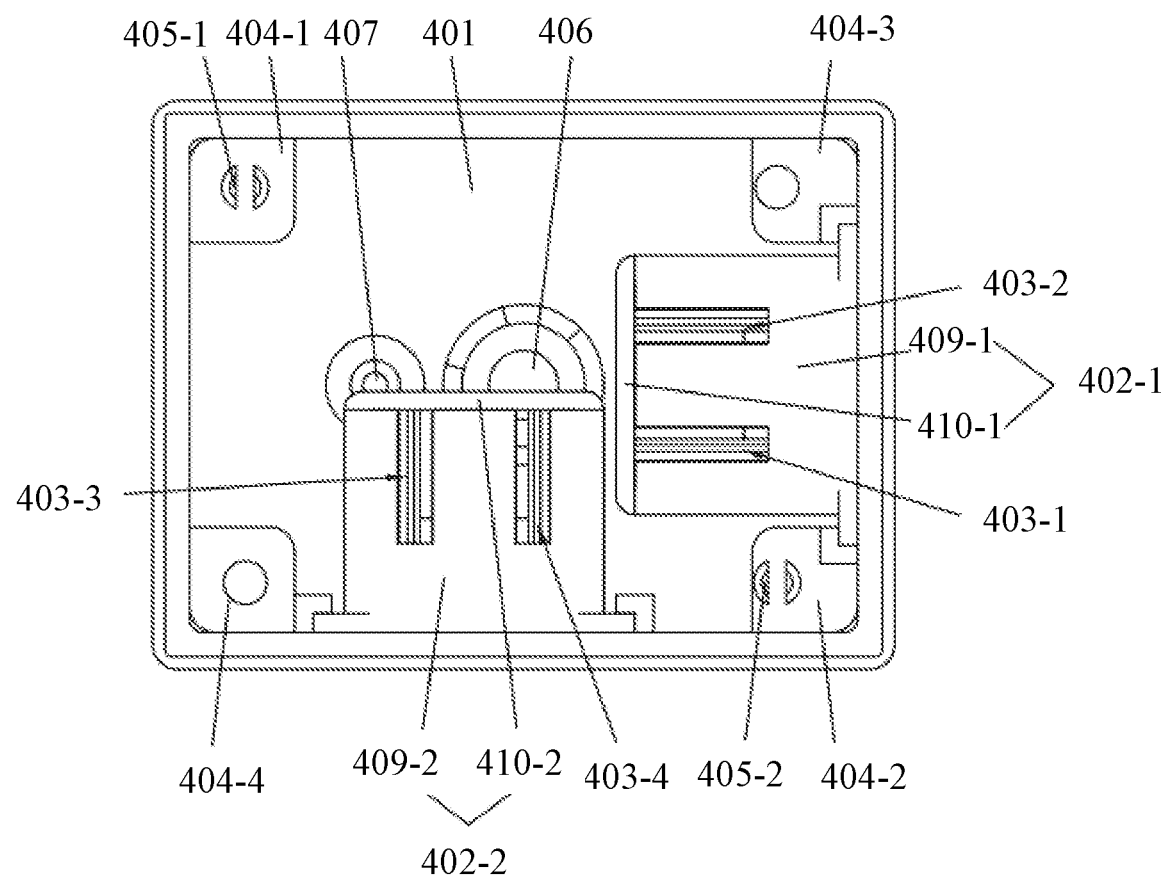
FIG. 4-A

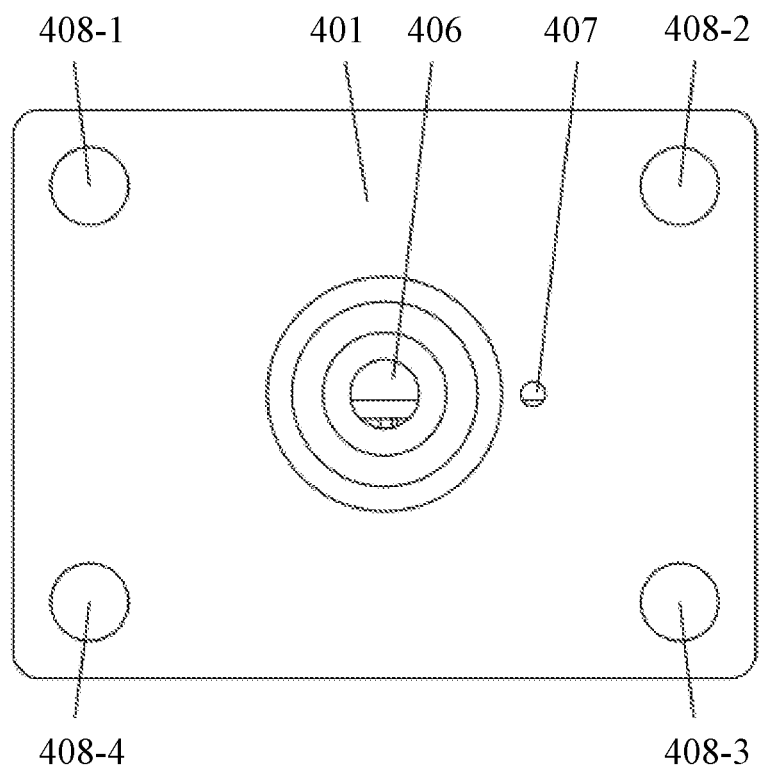
FIG. 4-B
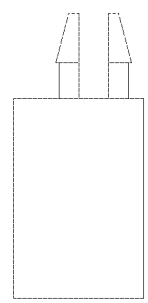
FIG. 4-C

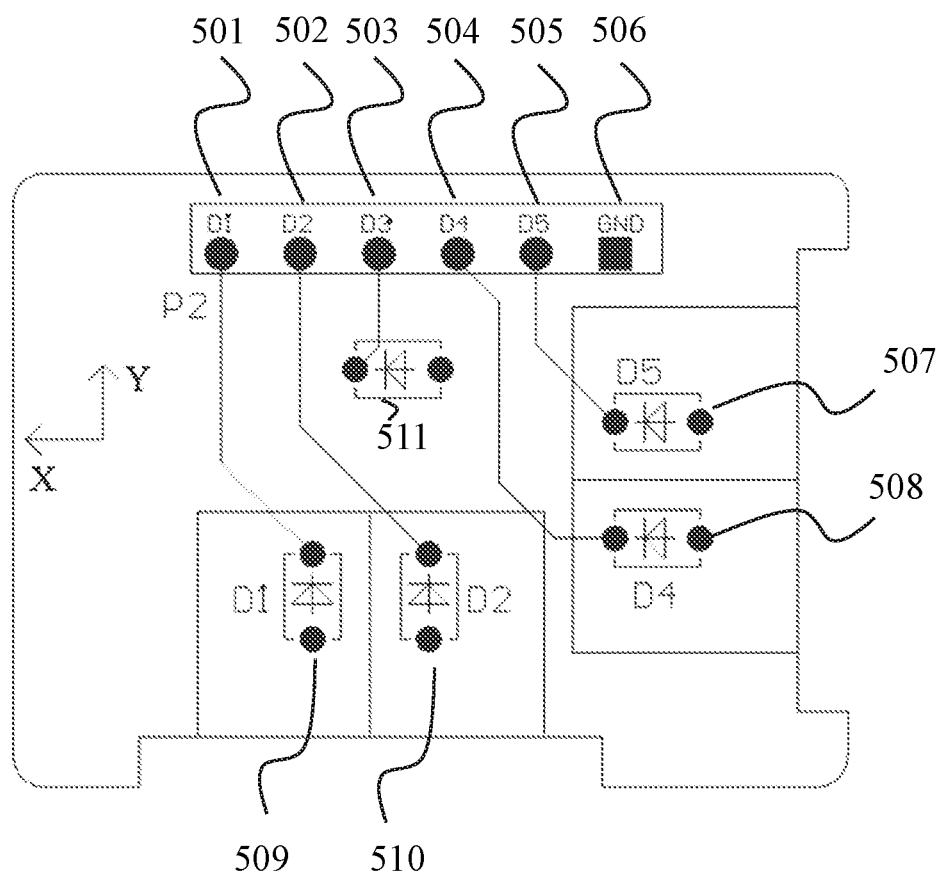
FIG. 5-A

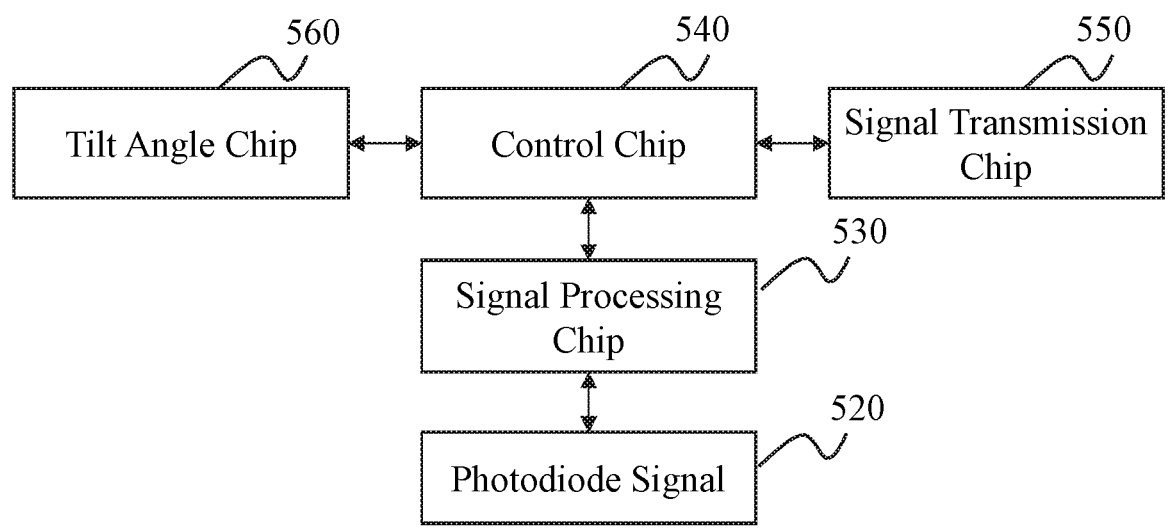
FIG. 5-B

SENSOR AND CONTROL METHOD THEREOF

CROSS-REFERENCE TO RELATED APPLICATIONS

This application is a continuation of International Application PCT/CN2016/113880, filed on Dec. 30, 2016, which claims priority to Chinese Patent Application No. 201611119751.0, filed on Dec. 8, 2016, the entire contents of each of which are hereby incorporated by reference.

TECHNICAL FIELD

The present disclosure relates to a sensor and a control method of the sensor, and in particular, relates to a sensor that is used in a tracking system.

BACKGROUND

With the development of modern industry, the global energy crisis and air pollution problems have become increasingly notable, and a new energy industry has flourished. Solar energy, as an ideal renewable and clean energy source, has received more and more attention. The technologies that use solar energy includes a technology for solar power generation and a technology for solar thermal power generation, among which the development of solar photovoltaic is gradually deepening. The industry of solar photovoltaic faces a problem of reducing the cost of electricity, and practitioners may need to optimize the power generation efficiency and increase the amount of photovoltaic power generation. A tracking bracket may be one of the most effective ways to reduce the cost of electricity, and has been more and more applied in a photovoltaic bracket. The tracking bracket may need to be further developed to improve the reliability of a photovoltaic tracking system, and a convenience of on-site installation, commissioning, operation, and maintenance.

A control mode of a photovoltaic tracking system may include an open loop control mode and a closed loop control mode. The open loop control mode commonly uses a hall sensor (Hall sensor), and determine a position of a device based on the count of pulses of a built-in hall sensor of a motor, so that the position of the device may be consistent with a theoretical position of the sun. The advantage of the open loop control mode may include that an algorithm is simple, and the position of the device may be directly determined based on a linear relationship after an origin is calibrated. However, the disadvantage of the open loop control mode may be that each device needs to be manually set based on a position limiting origin after installation, and the on-site debugging and installation may be complicated. In addition, due to the built-in hall sensor of the motor, the photovoltaic tracking system may not correct an equipment transmission error, a bracket deformation error, a bracket installation error, etc., and an overall control accuracy is not high.

The closed loop control mode may use a tilt sensor and a photosensitive sensor. The tilt sensor may directly measure an angle of the device and compare the angle with a theoretical angle to achieve a closed loop control. The advantage of the tilt sensor may be that it can be controlled in a simple way, and the device may directly perform tracking after an installation of the tilt sensor, and the relative position may not need to be set based on the origin. However, the disadvantage of the tilt sensor may be that it has a low accuracy and be easily influenced by a temperature drift. The device may be expensive if it is necessary to improve the accuracy and solve the problem of temperature drift. The increase in cost may not be suitable for photovoltaic tracking industry.

The photosensitive sensor may directly determine the positional relationship between the device and the sun, and determine a current sunlight intensity based on an analog signal of a photodiode. As an ideal feedback device for the photovoltaic tracking system, the photosensitive sensor may determine the positional relationship between the device and the sun based on a difference algorithm, and may be not affected by temperature. The accuracy of the photosensitive sensor may meet the requirements of the photovoltaic tracking system. However, due to weather changes, the light intensity may change, and the tracking effect of the photosensitive sensor may be poor during rainy days. In order to solve this problem, a tracking system using the photosensitive sensor may also utilize a hall sensor. This method may solve the problem of poor tracking performance on rainy days; however, there may be a problem in the initial installation and debugging of a hall sensor.

Compared to the problems of various tracking control methods in the prior art, the present disclosure may provide a sensor which combines a tilt sensor and a photosensitive sensor. The present disclosure may achieve a fast on-site installation based on a high-precision of the photosensitive sensor and an advantage of the tilt sensor that it doesn't need to be debugged, and achieve a tracking bracket that can perform a high-precision tracking control without a debugging of the tracking bracket.

SUMMARY

One aspect of the present disclosure relates to a sensor. The sensor may include a protective housing, an optical component, a control component, an interface component, and a circuit board mounted within the protective housing. The circuit board may include a plurality of detection components, wherein the detection components may include a photosensitive detection component and a tilt angle detection component.

According to some embodiments of the present disclosure, the photosensitive detection component may be mounted on a side of the circuit board facing a radiation source.

According to some embodiments of the present disclosure, the tilt angle detection component may be mounted on a side of the circuit board away from the radiation source.

According to some embodiments of the present disclosure, the sensor may further include a communication component.

According to some embodiments of the present disclosure, the protective housing may further include an outlet, a waterproof vent, and a circuit board positioning and placement interface. The circuit board positioning and placement interface may be used to position the circuit board.

According to some embodiments of the present disclosure, the outlet may include a four core outdoor shielded cable.

According to some embodiments of the present disclosure, the protective housing may include tempered glass.

According to some embodiments of the present disclosure, the optical component may further include a cover plate, a positioning hole of the cover plate, and a light transmission hole.

According to some embodiments of the present disclosure, the light transmission hole may further include an upper opening and a lower opening, and the upper opening is larger than the lower opening.

According to some embodiments of the present disclosure, the sensor may include at least two optical components, wherein the at least two optical components are arranged vertically.

According to some embodiments of the present disclosure, the at least two optical components may include a black weather resistant material.

According to some embodiments of the present disclosure, the photosensitive detection component may further include at least five photosensitive elements.

According to some embodiments of the present disclosure, the at least five photosensitive elements may include at least one photosensitive element for sensing radiation intensity and at least two photosensitive groups. A photosensitive group may include at least two photosensitive elements.

According to some embodiments of the present disclosure, the two photosensitive groups may be arranged vertically.

According to some embodiments of the present disclosure, each photosensitive element may include at least one of a photodiode, a phototransistor, a photoresistor, or a silicon photocell.

In one aspect of the present disclosure, a system is provided. The system may include a photovoltaic module and a tracker. The tracker may include a sensor. The sensor may include a photosensitive detection component and a tilt angle detection component.

In one aspect of the present disclosure, a method is provided. The method may include determining whether a photovoltaic module operates within an angle detection range of a photosensitive detection component. In response to a determination that the photovoltaic module operates within the angle detection range of the photosensitive detection component, the method may include determining whether an actuation condition of the photosensitive detection component is satisfied. In response to a determination that the actuation condition of the photosensitive detection component is satisfied, the method may further include actuating the photosensitive detection component. In response to a determination that the actuation condition of the photosensitive detection component is not satisfied, the method may further include actuating a tilt angle detection component.

According to some embodiments of the present disclosure, the method may further include recording a moving trajectory of a tracker.

According to some embodiments of the present disclosure, the method may further include determining whether the tilt angle detection component and the photosensitive detection component both break down. In response to a determination that the tilt angle detection component and the photosensitive detection component both break down, the method may include tracking a radiation source using the moving trajectory of the tracker, and notifying that the tilt angle detection component and the photosensitive detection component both break down.

According to some embodiments of the present disclosure, in response to a determination that the photovoltaic module does not operate within the angle detection range of the photosensitive detection component, the method may further include actuating the tilt angle detection component.

According to some embodiments of the present disclosure, the method may include determining whether the tilt angle detection component breaks down. In response to a determination that the tilt angle detection component breaks down, the method may further include tracking a radiation source using the moving trajectory of the tracker, and notifying that the tilt angle detection component breaks down.

According to some embodiments of the present disclosure, the method may include determining whether the tilt angle detection component breaks down. In response to a determination that the tilt angle detection component breaks down, the method may include actuating the photosensitive detection component to track the radiation source, and notifying that the tilt angle detection component breaks down.

According to some embodiments of the present disclosure, the method may include determining whether the photosensitive detection component breaks down. In response to a determination that the photosensitive detection component breaks down, the method may include actuating the tilt angle detection component to track the radiation source, and notifying that the photosensitive detection component breaks down.

Additional features of this disclosure may be described in the following description. Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The drawings described herein are used to provide a further understanding of the present disclosure, all of which form a part of this disclosure. It is to be expressly understood, however, that the exemplary embodiment(s) of this disclosure are for the purpose of illustration and description only and are not intended to limit the scope of the present disclosure. Like numerals in the present disclosure represent like structural components or operations unless otherwise stated.

FIG. 4-A is a schematic diagram illustrating a sensor without a circuit board in a protective housing of the sensor according to some embodiments of the present disclosure;

FIG. 4-B is a schematic diagram illustrating an outer side of a bottom surface of a protective housing of a sensor according to some embodiments of the present disclosure;

FIG. 4-C is a schematic diagram illustrating a bump and a plug connector of the sensor according to some embodiments of the present disclosure;

FIG. 5-A is a schematic diagram illustrating a front layout of a circuit board of the sensor according to some embodiments of the present disclosure;

FIG. 5-B is a schematic diagram illustrating a back layout of a circuit board of the sensor according to some embodiments of the present disclosure;

DETAILED DESCRIPTION

Figure 1:
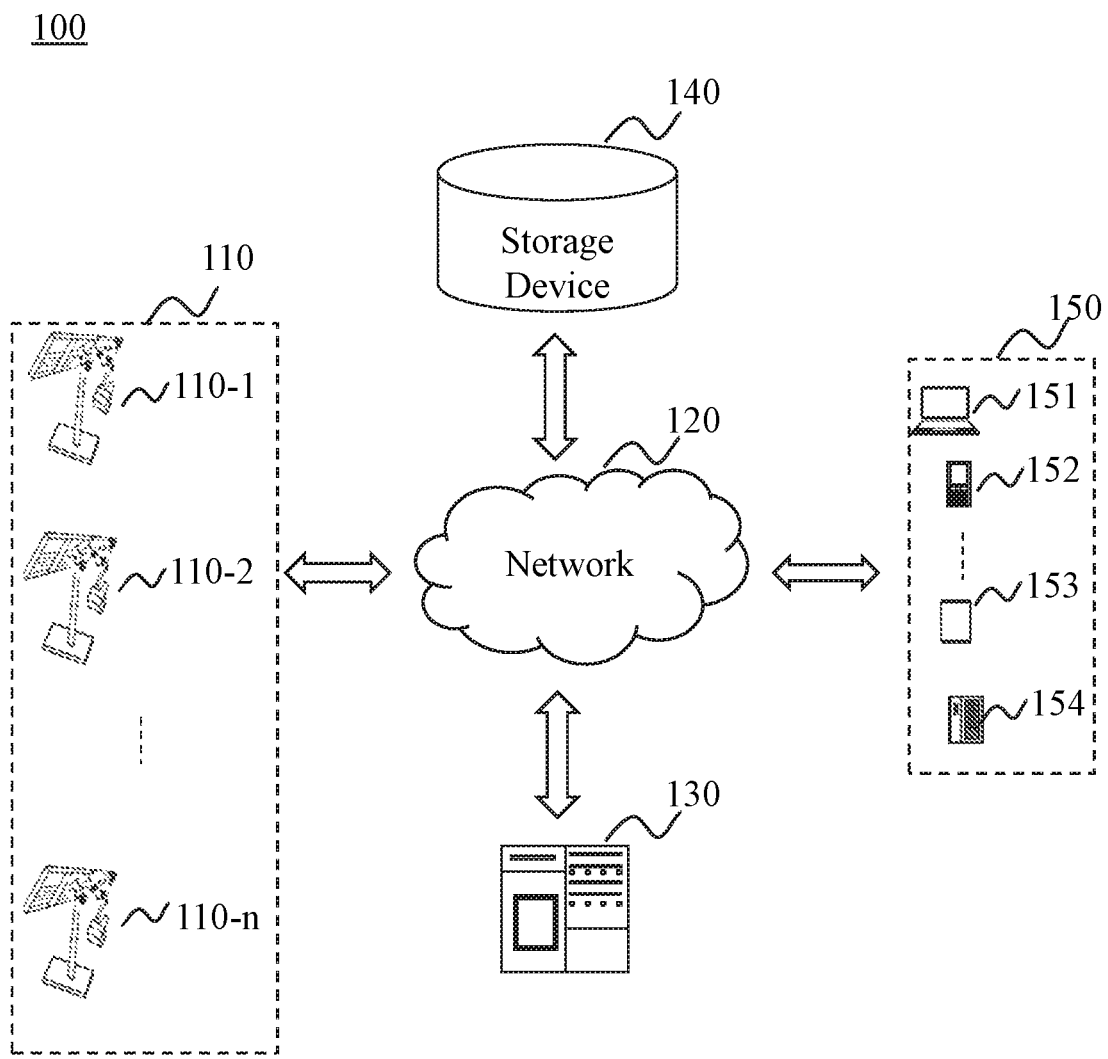
FIG. 1 illustrates a schematic diagram of a network environment including a tracking system according to some embodiments of the present disclosure.

In order to illustrate the technical solutions related to embodiments of the present disclosure, a brief introduction of the drawings is provided below. Obviously, the drawings described below are only some illustrations or embodiments of the present disclosure. A person of ordinary skill in the art, without further creative effort, may apply the present disclosure to other scenarios according to these drawings. Unless stated otherwise or obvious from the context, like reference numerals in the drawings refers to like structures or operations.

As used in the disclosure and the appended claims, the singular forms "a," "an," and "the" include plural referents unless the content clearly dictates otherwise. In general, the terms "comprising" and "comprising" are intended to include only the steps and elements that are specifically identified, and the steps and elements do not constitute an exclusive list, and the method or device may also include other steps or elements.

Some modules of the system may be described to in various ways according to some embodiments of the present disclosure; however, any number of different modules may be used and operated in a tracking system and/or a processor. These modules are intended to be illustrative, and different modules may be used in different aspects of the system and methods.

Flowcharts are used to illustrate the operations performed by the system according to some embodiments of the present disclosure. It is to be expressly understood, the operations above or below may or may not be implemented in order. Conversely, the operations may be performed in an inverted order, or simultaneously. Besides, one or more other operations may be added to the flow charts, or one or more operations may be omitted from the flow charts.

FIG. 1 illustrates a schematic diagram of a network environment 100 including a tracking system according to some embodiments of the present disclosure. The network environment 100 may include a tracking system 110, a network 120, a server 130, a storage device 140, and a terminal device 150. In some embodiments, the tracking system 110 may be a radiation source tracking system, for example, a photovoltaic tracking system.

The tracking system 110 may include one or more trackers, such as a tracker 110-1, a tracker 110-2, . . . , and a tracker **110-*n*, or the like. The tracker 110-*n* may include mechanical components, such as a photovoltaic module and a tracking bracket. The tracking bracket may be used to adjust an angle of the photovoltaic module. The photovoltaic module may follow the motion of the tracking bracket to track a radiation source. The incident plane of the photovoltaic module may be perpendicular or substantially perpendicular to incident light. In some embodiments, the rotation of the tracking bracket may drive the photovoltaic module to directly face or substantially directly face the radiation source (e.g., the sun, etc.) in real time. The "directly face the radiation source" may refer to that an incident light may be perpendicular to an incident plane of the photovoltaic module. For example, one or more photovoltaic modules of the tracking network environment 100** may directly face or substantially directly face the sun in real time with the movement of the tracking bracket.

In some embodiments, the photovoltaic module may convert light energy into electrical energy. In some embodiments, the light energy may be from a radiation source. The radiation source may be a substance or a device that releases various electromagnetic radiation. The electromagnetic radiation may include a cosmic ray, solar radiation, an X-ray, radiation from a reactor, or the like. The rest of the present disclosure may be described with reference to the sun as an example of the radiation source. For example, the photovoltaic module may be a solar photovoltaic panel. The exemplary embodiments of the present disclosure and the description are used to explain the present disclosure, and not intended to be limiting. The systems and methods of the present disclosure may be applied to an application of other radiation sources. In some embodiments, the photovoltaic module may be mounted on the tracking bracket, following the motion of the tracking bracket.

In some embodiments, the tracking system 110 may include a portion of the photovoltaic module of the tracker **110-*n*. For the convenience of description, the tracker 110-*n* described below may include one or more trackers (for example, tracker 110-1, 110-2, . . . , 110-*n*, etc.). The tracker 110-*n* may perform tracking based on a processing of acquired information. In some embodiments, the information may include position information, time information, weather information, or any combination thereof. In some embodiments, the tracker 110-*n* may include a tracking bracket. The tracking bracket may track the motion of the radiation source (e.g., the sun, etc.) such that the photovoltaic module may directly face or substantially directly face the radiation source in real time. The incident plane of the photovoltaic module may be perpendicular to the incident light from the radiation source to directly face the radiation source. In some embodiments, the tracker 110-*n*** may control the motion of the tracking bracket by processing the acquired information.

In some embodiments, the tracking control mode of the tracking system 110 may include an open loop control mode or a closed loop control mode. For example, the tracking motion of the tracker **110-*n* of the tracking system 110 may be implemented by setting a hall sensor to achieve an open loop control. As another example, the tracking motion of the tracker 110-*n* of the tracking system 110 may be implemented by setting a photosensitive sensor or a tilt sensor to achieve a closed loop control. In some embodiments, the tracker 110-*n* of the tracking system 110 may have a tracking motion by setting the hall sensor, the photosensitive sensor, the tilt sensor, or any combination thereof. In some embodiments, the tracking motion of the tracker 110-*n* of the tracking system 110** may be implemented by setting sensor(s) described in the present disclosure to achieve the closed loop control. The sensor(s) may include a plurality of detection components. For example, the detection components may include a photosensitive detection component and a tilt angle detection component.

In some embodiments, real-time information obtained by a sensor of the tracker 110-*n* may be sent to other device(s) of the network environment 100 via the network 120. In some embodiments, the tracking system 110, the server 130, the storage device 140, and the terminal device 150 may communicate via a wired connection, a wireless connection, or the wired connection in combination with the wireless connection. For example, the tracking system 110 may adjust the tracking mode based on weather information obtained from the network 120. For example, when the tracking system 110 acquires cloudy information, the tracking system 110 may control the tracking motion of the tracking bracket by a tilt angle detection component of a sensor. The network 120 may be a single network or a combination of networks. For example, the network 120 may be a local area network (LAN), a wide area network (WAN), a public network, a private network, a proprietary network, a public switched telephone network (PSTN), an Internet, a wireless network, a virtual network, a metropolitan area network, a telephone network, or the like, or any combination thereof. The network 120 may include multiple network access points, such as wired or wireless access points, including a wired access point, a wireless access point, a base station, a network switched point, etc. Through these access points, any data source may be connected to the network 120 and transmit information via the network 120. For illustration purposes, the tracking system 110 in the network environment 100 is taken as an example, and it is not intended to limit the scope of the present disclosure. For example, the network 120 of the network environment 100 may be divided into a wireless network (a Bluetooth, a wireless local area network (WLAN, Wi-Fi, WiMax, etc.)), a mobile network (2G, 3G, 4G, 5G network, etc.) or other connection manner (a Virtual Private network (VPN), a shared network, a near field communication (NFC), a ZigBee, a General Packet Radio Service (GPRS), etc.).

The server 130 may be used to perform an analysis and processing operation on data. The analysis and processing operation may include analyzing an operational status of the tracker 110-*n* of the tracking system 110, analyzing a break down condition of the tracker 110-*n* (e.g., whether has a malfunction, a malfunction type, a malfunction reason, etc.), selecting a control mode (for example, a control based on the tilt angle detection component, a control based on the photosensitive detection component, a tracking based on a moving trajectory, etc.) of the tracker 110-*n*, or any combination thereof. The methods used for data analysis and processing may include a linear regression analysis, a variance analysis, a principal component analysis, a discriminant analysis, a clustering analysis, a Bayes statistical analysis, or the like, or any combination thereof. In some embodiments, the server 130 may generate an angle curve of a moving trajectory based on the time and a tracking bracket angle, or may determine a malfunction condition of the tracker 110-*n* by identifying an anomaly curve. For example, when the sensor of the tracker 110-*n* breaks down, the server 130 may control the motion of the tracking bracket based on the angle curve of the moving trajectory.

The server 130 may receive data from the network 120. The data may be acquired from the tracking system 110, the storage device 140, or the terminal device 150. In some embodiments, the server 130 may also include a processing engine that analyzes and processes data of the tracking system 110, the storage device 140, and the terminal device 150. The data may include real-time operational data of the tracking system 110, reference data (e.g., historical operational data, operational status data, environmental data), or the like, or any combination thereof. For example, the real-time operational data may include a real-time angle (e.g., an azimuth angle, an elevation angle) of the tracking bracket and the radiation source, a real-time temperature of the tracking bracket, a real-time height of the tracking bracket, a real-time current of a motor, a real-time voltage of the motor, a real-time temperature of the motor, or the like, or any combination thereof. For example, the historical operating data may include a historical moving trajectory of the tracking bracket, historical weather information, or the like, or any combination thereof. In some embodiments, the operating state data may include a tracking bracket state, a motor state, a sensor state, or the like. For example, the operating state data may include a malfunction condition of the tracking bracket, a malfunction condition of the motor, a malfunction condition of the sensor, or the like. In some embodiments, the environmental data may include a wind speed, a wind direction, a temperature, an atmospheric pressure, an air humidity, a radiation amount, a radiation intensity, a rainfall, a snowfall, a soil moisture, a geographic coordinate, a time, an azimuth angle or an elevation angle of the radiation source, or the like, or any combination thereof. The radiation amount, the radiation intensity, the azimuth angle of the radiation source, or the elevation angle of the radiation source may relate to the sun, or another radiation source (e.g., a cosmic ray, a ray from a reactor, a star, an X-ray source, etc.). In some embodiments, the radiation amount may refer to a solar radiation amount. The radiation intensity may refer to a solar radiation intensity. The azimuth angle of the radiation source may be an azimuth angle of the sun. The elevation angle of the radiation source may refer to an elevation angle of the sun.

The server 130 may transmit the data analysis and processing result to the tracking system 110, the storage device 140, or the terminal device 150, or the like, via the network 120. The data analysis and processing result may include an operation state of the tracking system 110, a malfunction condition of the tracking system 110 (for example, whether has a malfunction, a malfunction type, a malfunction reason, etc.), a control mode of the tracker 110-*n*, or the like. For example, the server 130 may control the motion of the tracker 110-*n* according to a historical moving trajectory after the server 130 performs data analysis and processing and determines that a sensor of one or more trackers 110-*n* of the tracking system 110 breaks down. As another example, the server 130 may send a notification to a monitoring platform for the reference of a maintenance staff after the server 130 performs data analysis and processing and determines that the amount of electricity generated by the tracking system 110 is less than a certain threshold.

The server 130 may be a hardware server device, a server group, or any device that can provide computing service. In some embodiments, each server in a server group may be connected via a wired or wireless network. The server group may be centralized, for example, as a data center. The server group may be distributed, e.g., as a distributed system. In some embodiments, the server 130 may be a web server, a file server, a database server, an FTP server, an application server, a proxy server, a mail server, or the like, or any combination thereof. In some embodiments, a personal computer or another type of a work station or a terminal device 150, after being properly programmed, may be used as the server 130. The server 130 may be a local server, a remote server, a distributed server, or the like, or any combination thereof.

In some embodiments, the server 130 may be a cloud server. The cloud server may receive an instruction from the terminal device 150 to perform a corresponding processing operation. The instruction may include an instruction to upload data, an instruction to download data, an instruction to back up data, an instruction to delete data, an instruction to share data, or the like, or any combination thereof. For example, a user may send, via the terminal device 150, an instruction to back up data, and a cloud server may back up target data in a cloud storage space according to the backup instruction of the user. As another example, the user may send, via the terminal device 150, an instruction to download data, and the cloud server may download data from a target site according to the download instruction of the user. As a further example, the user may send, via the terminal device 150, an instruction to share data, and the cloud server may share target data with a specified object, such as another tracking system according to the sharing instruction of the user.

The storage device 140 may be a device with a storage function. The storage device 140 may be local or remote. In some embodiments, the storage device 140 or other storage device(s) in the system may store various information, such as a moving trajectory of a tracker 110-$n$, or the like. The storage device 140 or the other device(s) in the system may be an internal device of the system or an external device connected to the system. The connection between the storage device 140 and other storage device(s) of the system may be wired or wireless. The storage device 140 or other storage device(s) of the system may include a hierarchical database, a network database, a relational database, or the like, or any combination thereof. The storage device 140 or other storage device(s) of the system may digitize information, and then store the digitalized information in an electrical, magnetic, or optical storage device. The storage device 140 or other device(s) of the system may be a device configured to store information in the form of electric energy, e.g., a random-access memory (RAM), a read-only memory (ROM), or the like, or any combination thereof. The RAM may include a decimal counting tube, a selection tube, a delay line memory, a Williams tube, a dynamic random access memory (DRAM), a static random access memory (SRAM), a thyristor random access memory (T-RAM)), a zero-capacitor random access memory (Z-RAM), or the like, or any combination thereof. The ROM may include a magnetic bubble memory, a magnetic button line memory, a thin film memory, a magnetic plate line memory, a magnetic core memory, a drum memory, an optical disk drive, a hard disk, a magnetic tape, a phase change memory, a flash memory, an electronic erase type Rewritable read only memory, an erasable programmable read only memory, a programmable read only memory, a shielded heap read memory, a racetrack memory, a variable resistive memory, a programmable metallization cell, or the like, or any combination. The storage device 140 or other storage device(s) of the system may store information utilizing magnetic energy such as a hard disk, a software, tape, a magnetic-core memory, a bubble memory, a USB flash disk, flash memory, or the like. The storage device 140 or other storage devices of the system may be used to store information in the form of optical energy, such as a CD, a DVD, or the like. The storage device 140 or other storage device(s) of the system may store information in the form of magneto-optical energy, e.g., a magnetic disc, or the like. The access mode of the storage device 140 or other storage device(s) of the system may include a random access mode, a serial access mode, a read-only access mode, or the like, or any combination thereof. The storage device 140 or other storage device(s) of the system may be a volatile memory or a nonvolatile memory. The above-mentioned storage devices are examples only, and storage devices used in the system are not limited thereto.

In some embodiments, the storage device 140 may be a component of the tracking system 110 or the tracking system 110. For example, the tracking system 110 may retrieve information from the storage device 140 to control the tracking motion of the tracking bracket. In some embodiments, the storage device 140 may be a part of the tracking system 110. In some embodiments, the storage device 140 may be a part of the server 130. In some embodiments, the storage device 140 may be a part of the tracker 110-$n$. In some embodiments, the storage device 140 may operate independently and be directly connected to the network 120. In some embodiments, the storage device 140 may store data collected from the tracking system 110 and/or the network 120 and various data utilized, generated, and outputted in the operation of the tracking system 110. In some embodiments, the connection or communication between the storage device 140 and the tracking system 110, the network 120, and/or the server 130 may be a wired connection, a wireless connection, or a combination of the two connections. For example, if the storage device 140 and the network 120 are connected or communicated with each other, the server 130, tracking system 110, or terminal device 150 may access the storage device 140 via the network 120. In some embodiments, the storage device 140 may store a moving trajectory of the tracking bracket of the tracking system 110. For example, when the sensor breaks down, the tracker 110-$n$ may track according to a historical moving trajectory of the tracking bracket.

The terminal device 150 may be used to monitor the tracking system 110. The terminal device 150 may include a laptop computer 151, a mobile phone 152, a tablet computer 153, a monitoring station 154, a computer (not shown in FIG. 1), a television (not shown in FIG. 1), a projection device (not shown in FIG. 1), a smart watch (not shown in FIG. 1), a smart phone (not shown in FIG. 1), a somatosensory device (not shown in FIG. 1), or the like, or any combination thereof. The terminal device 150 may be used to display data. In some embodiments, the terminal device 150 may display data of the tracking system 110, data of the server 130, data of the storage device 140, or the like, or any combination thereof. The data may be real-time operational data of the tracking system 110, reference data (e.g., historical operating data, operating state data, and environmental data), intermediate data and result data generated by the server 130 in a processing process, data directly inputted by a user, or the like, or any combination thereof. For example, the terminal device 150 may display tracking motion data of a tracker 110-$n$ of the tracking system 110 at present or in a historical period. The displaying form may include a list, a graph (e.g., a line chart, a curve graph, a column chart, a pie chart, a satellite cloud image, etc.), text, a special symbol, a voice, or the like, or any combination thereof.

In some embodiments, terminal device 150 may receive malfunction data. The data may be received via a voice, text, a picture, a user action (e.g., a gesture), or the like, or any combination thereof. For example, the terminal device 150 may receive malfunction data of the tracking system 110. The malfunction data may be sent by the tracking system 110 or the server 130. The malfunction data may include malfunction data of one or more trackers 110-$n$. The malfunction data may include a malfunction type, a time when a malfunction occurred, a failure mode, a failure cause, a solution, a malfunction processing progress, or the like, or any combination thereof. The malfunction type may include a sudden malfunction, a gradual malfunction, or the like, or any combination thereof. For example, the malfunction data may include processing status information of different malfunctions. The processing status information of the malfunction may include pending, in processing, processed, or the like, or any combination thereof. For example, the malfunction data may include a pending malfunction of the tracking system 110.

In some embodiments, the terminal device 150 may receive an alarm signal and generate an alarm notification. The alarm signal may be generated by the tracking system 110 or the server 130. The server 130 may send the alarm signal to the terminal device 150 after analyzing and processing received data and determining that the one or more trackers 110-n break down. After receiving the alarm signal, the terminal device 150 may generate an alarm notification. The alarm notification generated by the terminal device 150 may include an image alarm notification, a message alarm notification, an email alarm notification, a sound alarm notification, a vibration alarm notification, an indicator light alarm notification, or the like, or any combination thereof. For example, after receiving the alarm signal, the mobile phone 152 may generate a massage alarm notification. As another example, after receiving the alarm signal, the terminal device 150, such as the monitoring station 154, may generate a sound alarm notification or display an alarm indicator light. In some embodiments, the terminal device 150 may send a control signal to control the tracking system 110. The control signal may be a control instruction inputted by a user of the terminal device 150 or a control instruction determined by the terminal device 150. The control signal may control the tracking system 110 to set an angle of the tracking bracket, select a control mode of the tracking bracket, set a malfunction alarm threshold, set permission or the like. For example, the user may set the tracking control mode of the tracker 110-n based on the weather.

It should be noted that the network environment 100 of the radiation source tracking system described above is provided for the purposes of illustration, and not intended to limit the scope of the present disclosure. For persons having ordinary skills in the art, the modules may be combined in various ways, or connected with other module(s) to form a sub-system. However, those variations and modifications may not depart the spirit and scope of this disclosure. For example, the tracking system 110 may control the tracking motion of the tracker 110-n using a hall sensor, a photosensitive sensor, a tilt sensor, or the like, or any combination thereof. As another example, the tracking system 110 may be connected to the server 130, the storage device 140, the terminal device 150, or the like. All such modifications are within the protection scope of the present disclosure.

Figure 2:
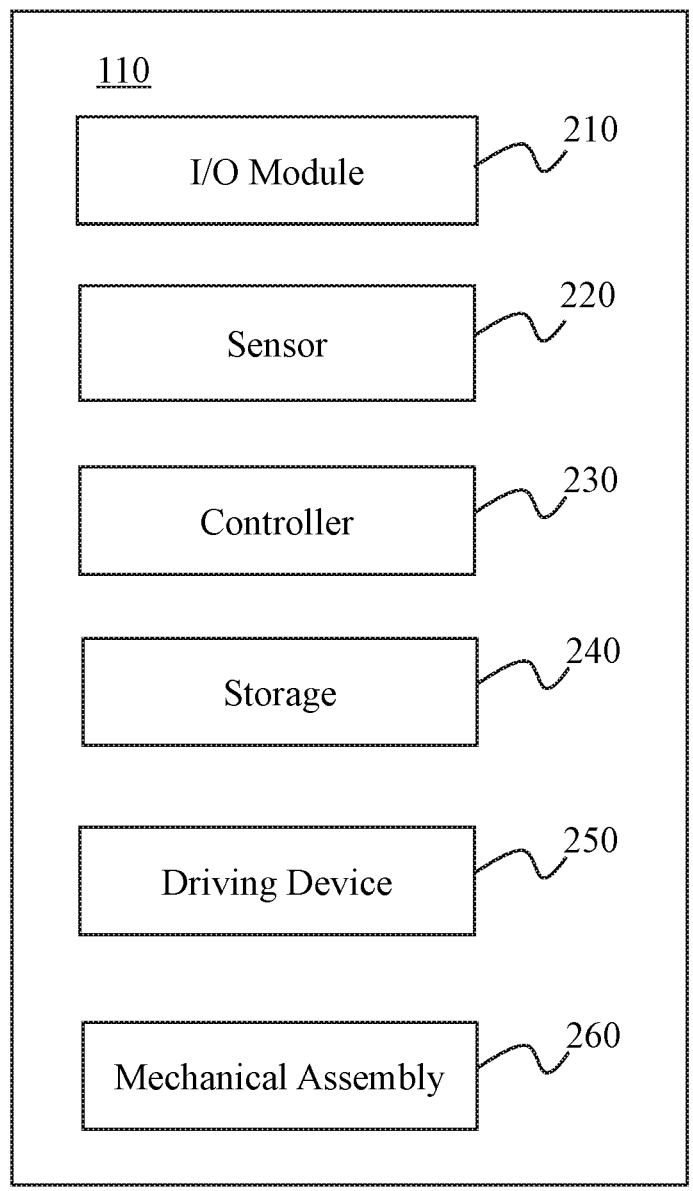
FIG. 2 is a block diagram illustrating a tracking system according to some embodiments of the present disclosure.

FIG. 2 is a block diagram illustrating a tracking system according to some embodiments of the present disclosure. The tracking system 110 may include an I/O module 210, a sensor 220, a controller 230, a storage 240, a driving device 250, and a mechanical assembly 260. The tracking system 110 may enable that a photovoltaic module of a tracker 110-n directly faces or substantially directly faces a radiation source (e.g., the sun, etc.) in real time.

The I/O module 210 may acquire, transmit, and send signal(s). The I/O module 210 may be connected to or communicated with other component(s) in the network environment 100 of the tracking system. Other component(s) in the network environment 100 of the tracking system may establish a connection or communication via the I/O module 210. The I/O module 210 may be a wired USB interface, a serial communication interface, a parallel communication port, or a wireless Bluetooth, infrared, a radio-frequency identification (RFID), a WLAN Authentication and Privacy Infrastructure (WAPI), a General Packet Radio Service (GPRS), a Code Division Multiple Access (CDMA), or the like, or any combination thereof.

In some embodiments, the I/O module 210 may be connected to the network 120 and acquire signal(s) via the network 120. In some embodiments, the I/O module 210 may acquire signal(s), for example, historical operating data of a tracker and a position signal of the tracker from the storage 240. In some embodiments, the I/O module 210 may acquire signal(s), for example, a control signal, a sampling result, a time signal, a rotation direction signal of the tracking bracket, a historical operating data of the tracker, an angle signals of the tracking bracket, a light intensity signal, a wind speed signal, a position signal of the tracker, or the like, or any combination thereof, from the sensor 220. In some embodiments, the I/O module 210 may include a VCC, a GND, an RS-232, an RS-485 (for example, an RS485-A, an RS485-B), a general-purpose network interface, or the like, or any combination thereof.

In some embodiments, the I/O module 210 may send an acquired external signal to the controller 230. For example, the I/O module 210 may send acquired weather information to the controller 230. The controller 230 may select a control mode of the tracking motion of the tracker 110-n according to the weather information. In some embodiments, the I/O module 210 may obtain a signal of the sensor 220 and send the signal to other module(s) of the tracking system 110. For example, the I/O module 210 may obtain a control signal of the sensor 220 and send the control signal to the controller 230. The controller 230 may drive the driving device 250 to drive the mechanical assembly 260 according to the control signal. The I/O module 210 may establish a communication between the tracking system 110 and the network 120. The communication may include a wired communication and/or a wireless communication. The wired communication may be implemented via a transmission medium including a wire, a cable, an optical cable, a waveguide, nanomaterial, and the like. The wireless communication may include an IEEE 802.11 wireless local area network communication, an IEEE 802.15 wireless communication (e.g., Bluetooth, Zig-Bee, etc.), a mobile communication (e.g., TDMA, CDMA, WCDMA, TD-SCDMA, TD-LTE, FDD-LTE, etc.), a satellite communication, a microwave communication, a scatter communication, an atmospheric laser communication, etc. In some embodiments, the I/O module 210 may encode a signal to be transmitted using one or more encoding techniques. The encoding technique(s) may include a phase encoding, a non-returning zeroing, a differential Manchester encoding, or the like, or any combination thereof.

The sensor 220 may measure a signal. The sensor 220 may detect information to be measured and convert the detected information into an electrical signal or other desired form of signal (e.g., a digital signal, an analog signal) according to a certain rule. The signal may include a time signal, a rotation direction signal of the tracking bracket, historical operation data of the tracking bracket, an angle signal of the tracking bracket, a light intensity signal, a wind speed signal, a tracker position signal, or the like. In some embodiments, the sensor 220 may include one or more sensors. The sensor(s) may include a hall sensor, a position sensor (e.g., a tilt sensor), a photosensitive sensor (e.g., a photosensitive sensor), a pressure sensitive sensor, a liquid level sensor, an energy sensor, a speed sensor, an acceleration sensor, a radiation sensor, a thermal sensor, a gas sensor, a force sensor, a magnetic sensor, a humidity sensor, an acoustic sensor, a color sensor, a taste sensor, a vibration sensor, a vacuum sensor, a biological sensor, or the like.

The controller 230 may send a control instruction to the driving device 250. For example, the control instruction sent by the controller 230 may be obtained from the server 130, the terminal device 150, or be sampled by the sensor 220. In some embodiments, the server 130 may process data acquired by the sensor 220, and determine the control instruction that controls the tracking system 110. In some embodiments, the user may directly input a control instruction that controls the tracking system 110 through the terminal device 150 (for example, a mobile phone, a laptop computer, etc.). In some embodiments, the controller 230 may determine the generated control instruction.

The control instruction sent by the controller 230 may be an instruction for selecting a control mode, an instruction for adjusting an angle of the tracking bracket, an instruction for controlling the operation of the motor, or the like, or any combination thereof. The control instruction may include an actuation instruction and a termination instruction. The actuation instruction may cause the driving device 250 to perform an action. The termination instruction may cause the driving device 250 to terminate an action. In some embodiments, the control instruction may be an instruction to control the angle of the tracking bracket, an instruction to control the rotation direction of the tracking bracket (for example, rotating eastward and rotating westward), an instruction to flatten the tracking bracket, an instruction to control the count of revolutions of the motor, an instruction to generate a malfunction alarm, or the like, or any combination thereof. In some embodiments, the controller 230 may output an instruction to control a target tracking angle of the tracking bracket by processing a time signal, a position signal of the tracker 110-$n$, and an angle signal of the tracking bracket, or the time signal and historical tracking motion data of the tracker 110-$n$. The processing may be performed based on an astronomical algorithm. In some embodiments, the controller 230 may output an instruction to control the rotation direction of the tracking bracket after the controller 230 performs a processing operation according to a rotation direction signal of the tracking bracket. In some embodiments, the controller 230 may output an instruction to control the flattening of the tracking bracket after the controller 230 performs a processing operation according to a wind speed signal. In some embodiments, the controller 230 may output an instruction to control the count of revolutions of the motor after the controller 230 performs a processing operation according to a light intensity signal. In some embodiments, the controller 230 may output an instruction to generate a malfunction alarm according to a detection result.

In response to an instruction generated by the controller 230 to select a control mode, the driving device 250 may drive the motor to perform one or more actions of the tracking bracket under a particular control mode. The control mode may include an alarm mode, a wind mode, a rainy day mode, a cloudy mode, a snow day mode, a manual mode, an automatic mode, or any combination thereof. For example, under an instruction relating to the wind mode, the driving device 250 may drive the motor to rotate the tracking bracket to an angle that is parallel or substantially parallel to the ground. As another example, under an instruction relating to the rain mode or the snow mode, the driving device 250 may drive the motor to rotate the tracking bracket to an angle that is vertical or substantially vertical to the ground.

As another example, under an instruction relating to the automatic mode, the controller 230 may determine the elevation angle and the azimuth angle of the sun based on an astronomical algorithm according to the time, a geographic coordinate of the tracking bracket, and the real-time angle of the tracking bracket. Based on the determined elevation angle and azimuth angle of the sun, the controller 230 may issue a driving instruction to the driving device 250 to cause the driving device 250 to drive the motor to rotate, thereby rotating the tracking bracket such that the photovoltaic module directly faces or substantially faces the sun in real time.

In some embodiments, the controller 230 may acquire a tracking control signal of the sensor 220 and control the driving device 250 to drive the rotation of the motor based on the tracking control signal, making the tracking bracket and/or a component fixed on the tracking bracket (e.g., a photovoltaic module, one or more sensors, etc.) to track a radiation source. The tracking control signal may include a control signal of a photosensitive detection component, a control signal of a tilt angle detection component, or a control signal based on a historical moving trajectory. For example, on a cloudy day, the controller 230 may obtain a signal from the tilt angle detection component of the sensor 220. In some embodiments, the photosensitive detection component and the tilt angle detection component may both break down. The controller 230 may obtain a history tracking moving trajectory of the tracker 110-$n$, and the driving device 250 may drive the motor such that the tracking bracket may have a tracking motion based on the historical tracking moving trajectory. The historical tracking moving trajectory may be represented by an angle curve of a recent tracking motion. For example, the tracking system 110 may record an angle curve of a tracking motion on a sunny Monday. Tuesday day is cloudy. On Wednesday, if the controller 230 detects a signal showing that the photosensitive detection component and the tilt angle detection component both break down, the controller 230 may drive the driving device 250 to drive a tracking motion of the tracking bracket according to the angle curve of the tracking motion recorded on Monday.

The storage 240 may be configured to store signal(s). The signal(s) may include data generated in the tracking process of the tracker and a signal acquired by the I/O module 210. The signal(s) may include text, a number, a sound, an image, a video, or the like, or any combination thereof. In some embodiments, the storage 240 may include various types of storage devices such as a solid state hard disk, a mechanical hard disk, a USB flash memory, an SD memory card, a compact disk, a random access memory (RAM), and a read-only memory (ROM), or the like, or any combination thereof. In some embodiments, the storage 240 may be a local storage device of the tracker 110-$n$, an external storage device, or a storage device (e.g., a cloud storage, etc.) connected to the network 120. In some embodiments, the storage 240 may include a data management unit. The data management unit may monitor and manage data in the storage, and remove data with no or low utilization, so that the storage 240 may have sufficient storage capacity. In some embodiments, the storage 240 may store an angle curve of a tracking motion of the tracking system 110 on a sunny day.

The driving device 250 may execute a control instruction outputted by controller 230. In some embodiments, the driving device 250 may execute an instruction outputted by the controller 230 to control the operation of the motor such that the tracking bracket and/or component(s) fixed on the tracking bracket (e.g., a photovoltaic module, one or more sensors, etc.) may track a radiation source. The tracking motion may include a tracking motion under a closed loop control and a tracking motion under an open loop control. The closed loop control may refer to adjusting the angle of the tracking bracket based on a count of revolutions of the motor, and then receiving a feedback including a position signal of the tracking bracket from an angle sensor. The open loop control may refer to adjusting the angle of the tracking bracket based on the count of revolutions of the motor without the feedback received from an angle sensor. The position signal may be a position signal relating to the radiation source, a position signal relating to the tracking bracket, or the like. In some embodiments, the driving device 250 may execute an instruction outputted by the controller 230 to flatten the tracking bracket. In some embodiments, the driving device 250 may execute an instruction outputted by the controller 230 to control the operation of the motor so that the photovoltaic module may directly face or substantially directly face the sun in real time. In some embodiments, the driving device 250 may execute an instruction outputted by the controller 230 to terminate the operation of the motor.

In some embodiments, the driving device 250 may include a transistor, a relay, or the like. In some embodiments, the driving device 250 may include one or more transistors and one or more relays. For example, the driving device 250 may include one transistor and two relays. In some embodiments, the driving device 250 may be driven by a combination of transistor(s) and relay(s). In some embodiments, the combination may cause the relay(s) to be pulled in and released instantaneously, wherein a contact may have no electric action, which may reduce the influence of an arc generated by the contact when the power is turned on and off. This may prolong the life of the driving device 250. For example, when the driving device 250 receives a control instruction from the controller 230, the relay may be pulled in, and then the transistor may be powered on. As another example, when the driving device 250 receives a termination instruction from the controller 230, the transistor may be pulled in and then the relay may be released. The driving device 250 may drive the operation of the motor. The driving device 250 may drive the operation of the motor to adjust the speed, start operating, terminate operating, operate in a stepping mode, or operate with a constant speed. In some embodiments, the driving device 250 may include a turbine worm reducer fixed to the tracking bracket and a driving arm fixed to the turbine worm reducer. The turbine worm reducer may be driven by the motor. The movement of the turbine worm reducer may drive the movement of the driving arm, thereby driving the tracking bracket.

The mechanical assembly 260 may include the photovoltaic module, the motor, a limiting switch, and the tracking bracket. The photovoltaic module may be a solar panel, which may convert solar energy into electrical energy. The photovoltaic module may be a monocrystalline silicon photovoltaic module, a polycrystalline silicon photovoltaic module, an amorphous silicon photovoltaic module, or a diversified photovoltaic module.

The motor may drive the operation of the tracking bracket. In some embodiments, the motor may generate a driving torque as a power source of the tracking bracket. The motor may be a direct current motor and or an alternating current motor according to the type of an operation power supply. The motor may be an asynchronous motor or a synchronous motor according to the structure and working principle of the motor. The motor may be a drive motor, a control motor, or the like according to the usage of the motor. The motor may be a high speed motor, a low speed motor, a constant speed motor, or a variable speed motor according to the operating speed of the motor.

The limiting switch may define a limiting position of a mechanical device. In some embodiments, the limiting switch may include an operation limiting switch and an extreme limiting switch. The operation limiting switch may be installed at a position where the mechanical device needs to change an operation condition. A signal may be generated if the operation limiting switch is actuated, and the mechanical device may perform another action. The limiting switch may be installed at the farthest position that the mechanical device can reach to protect the mechanical device from damage due to movement. In some embodiments, a limiting switch may protect the tracking bracket when the tracking bracket is out of an operating range.

The tracking bracket may be used to adjust the angle of the photovoltaic module. In some embodiments, the photovoltaic module may be mounted on the tracking bracket. The photovoltaic module may follow the tracking bracket to perform a tracking motion. In some embodiments, the tracking bracket may include a single axis tracking bracket and a multi-axis tracking bracket. In a single-axis tracking bracket, a component attached to the tracking bracket, such as a photovoltaic module may move along a single axis. In a multi-axis tracking bracket, the photovoltaic module may move along a plurality of axes. For example, a two-axis tracking bracket may rotate the photovoltaic module along two axes to simultaneously track changes in the azimuth angle and elevation angle of the radiation source (e.g., the sun, etc.).

It should be noted that the description above about the tracker of the tracking system is provided for illustration purposes, and not intended to limit the present disclosure within the scope of the disclosed embodiments. It is understood that, for persons having ordinary skills in the art, the modules may be combined in various ways, or connected with other module(s) to form a sub-system to modify or change the configuration of the tracker in various ways. However, those variations and modifications may not depart the spirit and scope of this disclosure. For example, the I/O module 210 may be divided into an input module and an output module according to a flow direction of signal/electrical energy. As another example, the limiting switch may be omitted from the tracking system 110.

Figure 3:
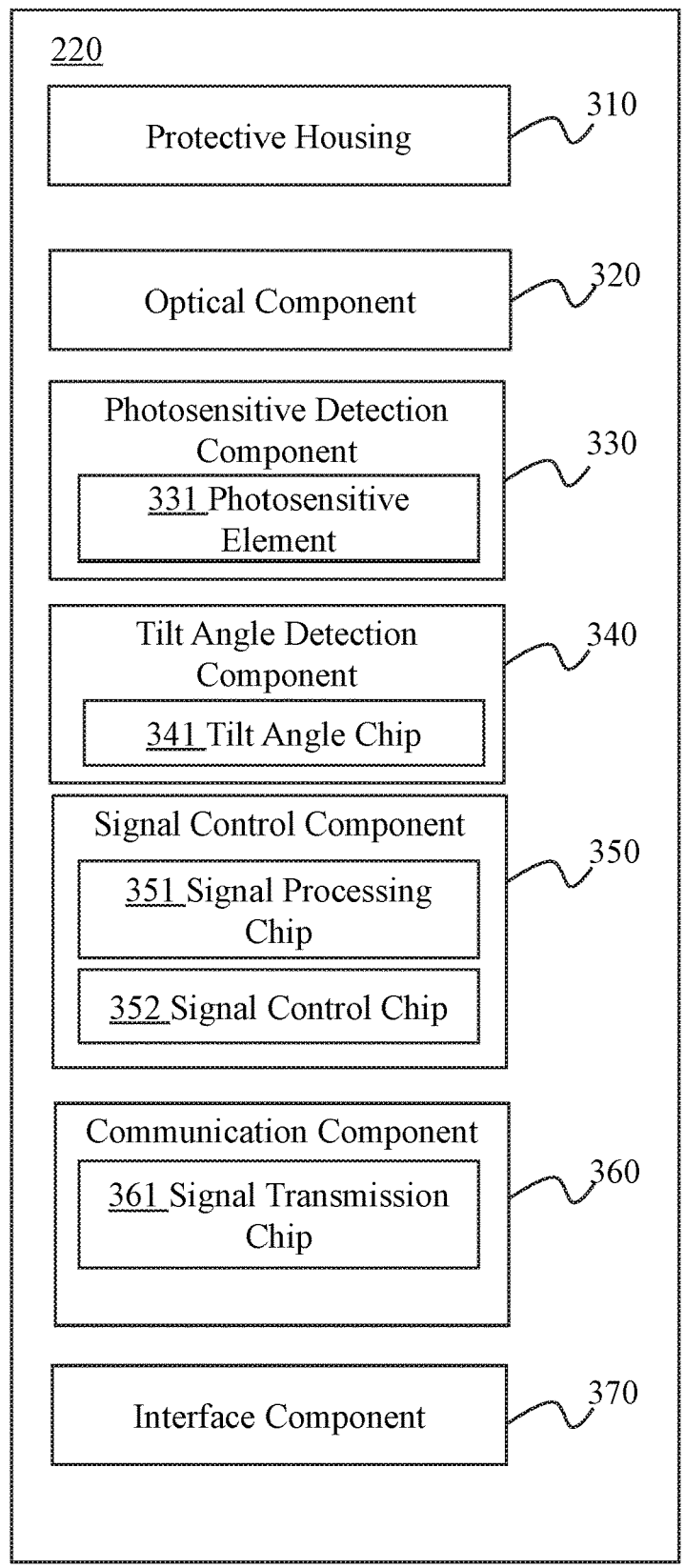
FIG. 3 is a schematic diagram illustrating a sensor according to some embodiments of the present disclosure.

FIG. 3 is a schematic diagram illustrating a sensor according to some embodiments of the present disclosure. The sensor 220 may acquire a position of a radiation source, acquire a position of a tracking bracket, a control signal for transmitting a tracking motion, or the like. The sensor 220 may include a protective housing 310, an optical component 320, a photosensitive detection component 330, a tilt angle detection component 340, a signal control component 350, a communication component 360, and an interface component 370.

The protective housing 310 (as shown in FIG. 4-A, FIG. 4-B, FIG. 4-C) may include an outlet, a waterproof vent, a circuit board positioning and placement interface. The outlet may use a four core outdoor shielded cable, which realizes a multi-interface communication by means of communication transmission. The signal of the four core outdoor shielded cable may include a VCC, a GND, an RS485-A, or an RS485-B. The waterproof vent may balance an internal-external pressure difference to achieve a balance between an external pressure and an internal pressure of the sensor. The circuit board positioning and placement interface may utilize a mold of high precision to accurately maintain the position of the circuit board and the position of the optical component(s) relative to each other. The protective housing 310 may be made of tempered glass. The tempered glass may withstand scratching or damage caused by a hard object. The tempered glass may withstand damage caused by outdoor aging and wiping.

The optical component 320 may include a cover plate, a positioning hole of the cover plate, and a light transmission hole. In some embodiments, the sensor 220 may include at least two optical components (such as 402-1 and 402-2 shown in FIG. 4-A), and the two optical components may be arranged vertically. The two optical components arranged vertically may detect an azimuth angle and an elevation angle of the radiation source, for example, detect the sunlight in the azimuth angle direction and the pitch direction. The optical component may be made of a black material that is weather resistant. The black material may absorb scattered and reflected light to mitigate or avoid an influence of the scattering and reflected light on accuracy.

The photosensitive detection component 330 may include a photosensitive element 331. The photosensitive element 331 may acquire a photosensitive signal by sampling. In some embodiments, the photosensitive detection component 330 may include at least five photosensitive elements. For example, the at least five photosensitive elements may include a photosensitive element for sensing radiation intensity and two photosensitive groups. A photosensitive group may include at least two photosensitive elements. For example, a photosensitive group may include two photosensitive elements or four photosensitive elements, or the like. In some embodiments, the two photosensitive groups may be arranged vertically and connected to the two optical components, respectively. In some embodiments, the difference between two photosensitive elements in a photosensitive group may be used to determine a positional relationship between the tracker and the sun. A photosensitive element may be one or more of a phototube, a photomultiplier tube, a photoresistor, a photodiode, a phototransistor, a solar cell, a silicon photocell, an infrared sensor, an ultraviolet sensor, a fiber optic sensor, a color sensor, a CCD, and a CMOS image sensor. The photosensitive detection component 330 may be mounted on a side facing the radiation source.

The tilt angle detection component 340 may be used to measure an equipment angle variation. The equipment angle variation may be an angular change, such as a change in a horizontal angle, a change in a vertical angle, or a combination of the changes, of the mechanical assembly 260 during a movement. The tilt angle detection component 340 may include a tilt angle chip 341. The tilt angle chip 341 may acquire an angle signal by sampling. The tilt angle detection component 340 may be mounted on a side of the circuit board backing to the radiation source. This mounting manner may avoid direct sunlight on the tilt angle detection component 340 to reduce the operating temperature of the tilt angle detection component 340, thereby improving the reliability of the sensor.

The signal control component 350 may include a signal processing chip 351 and a signal control chip 352. The signal processing chip 351 may process the photosensitive signal of the photosensitive element 331. The signal control chip 352 may process the angle signal of the tilt angle chip 341 and the processed photosensitive signal, and transmit the processed signal(s) to the controller 230.

The communication component 360 may include a signal transmission chip 361. The signal transmission chip 361 may achieve an input or output of a signal. For example, the signal transmission chip 361 may transmit a control signal of the signal control component 350 to the controller 230. As another example, the signal transmission chip 361 may transmit a photosensitive signal of the photosensitive element 331 to the signal processing chip 351. The communication component may utilize a transmission technique, such as RS458 or RS232. The interface component 370 may connect the sensor 220 with other device(s) of the tracking system 110.

It should be noted that the description above about the sensor is provided for illustration purposes, and not intended to limit the present disclosure within the scope of the disclosed embodiments. For persons having ordinary skills in the art, after understanding the principles of various components and without departing the principles, modules may be combined in various ways, or connected with other module(s) as a sub-system to modify and change the configuration of the sensor in various ways. However, those variations and modifications may not depart the spirit and scope of this disclosure. For example, the communication component may include an interface component.

FIG. 4-A is a schematic diagram illustrating a front view of a sensor 220 according to some embodiments of the present disclosure. FIG. 4-B is a schematic diagram illustrating a back view of the sensor 220 according to some embodiments of the present disclosure. Because the sensor 220 is usually placed in an outdoor environment, the sensor 220 may be exposed to rain, snow, sand, and sunlight. Therefore, the sensor 220 may include a protective housing 401. The protective housing 401 may be used to protect the internal component(s) of the sensor 220 from the natural environment. The protective housing 401 may have a shape of a rectangular parallelepiped, a cube, a cylinder, a sphere, a pie, a cone, a fusiform, or the like, or any combination thereof. The protective housing 401 may include a top surface, a bottom surface, and a plurality of sides surrounding the top surface and the bottom surface.

The sensor 220 may measure the orientation of the sun, so it is desired that the protective housing 401 does not interfere with daylight. At least one side of the protective housing may be opaque or transparent to light. In some embodiments, the top surface of the protective housing may be made of one or more light-transmitting materials, for example, ordinary glass, plexiglass, tempered glass. In some embodiments, a part of the top surface of the protective housing 401 may have a shape of a lens, which may concentrate sunlight so that the sunlight energy may pass through the protective housing and be detected by the photosensitive detection component 330. In some embodiments, a lens may be arranged on the top surface of the protective housing 401, and the lens and the top surface of the protective housing 401 may be connected by a seal to ensure sealing property. In some embodiments, the top surface of the protective housing 401 itself may be designed as a lens.

In some embodiments, the protective housing 401 may have an outlet 406. The outlet 406 may be used to guide an output line connected to an electronic component inside the protective housing 401 to the outside of the protective housing 401. The output line connecting to the electronic component inside the protective housing may include but not limited to one or more of an output line of the photosensitive detection component, an output line of the tilt angle detection component, an output line of the signal control component, an output line of the interface component, and an output line of the communication component. In some embodiments, the outlet 406 may use a four core outdoor shielded cable with signal(s) of VCC, GND, RS485-A, or RS485-B. In some embodiments, the outlet 406 may have a slot configured to fix the output line. The outlet 406 may be sealed with the output line, for example, by a sealing operation such as potting, thereby enhancing the waterproof performance of the sensor 220 and improving the service life of the sensor. In some embodiments, the outlet 406 may be mounted on the bottom surface of the protective housing 401.

In some embodiments, the protective housing 401 may have a waterproof vent 407. The sensor 220 may receive sunlight in an outdoor environment, which may cause an increase in the pressure inside the protective housing 401 after the air is heated. The waterproof vent 407 may be connected to the internal of the protective housing to balance the pressures inside and outside the protective housing 401. In some embodiments, the waterproof vent 407 may be covered with a waterproof breathable membrane to prevent moisture from entering the protective housing 401, thereby balancing the pressure inside and outside the protective housing 401 without water and prolonging the service life of the sensor 220.

The protective housing 401 may have one or more bumps 404. The bump(s) 404 (for example, bumps 404-1, 404-2, 404-3, and 404-4) may be placed on an inside surface of the bottom surface of the protective housing to support and fix the circuit board 500 (Details regarding the circuit board 500 may be found in FIGS. 5A and 5B and the relevant descriptions thereof). In some embodiments, the bump(s) 404 (for example, bumps 404-1 and 404-2) may include a plug connector 405 (for example, plug connectors 405-1 and 405-2) which is connected to the circuit board. As shown in FIG. 4-C, the plug connector 405 may be a positioning column having two clamping blocks on the top. It may support and also position the circuit board, and the circuit board may be positioned using a snap without screws.

The protective housing 401 may have one or more mounting components 408. The mounting component(s) 408 (e.g., mounting components 408-1, 408-2, 408-3, and 408-4) may be used to fix the sensor 220. In some embodiments, the mounting component(s) 408 may be a threaded screw fastening port. The mounting component(s) 408 may directly install a threaded seat into a tool without exposing from the bottom surface of the sensor 220, which may improve installation precision and achieve simple installation.

It should be noted that the above description of the sensor 220 is provided for the purpose of illustration, and not intended to limit the scope of the present disclosure. It is understood that persons having ordinary skills in the art, after understanding the principles of the modules and without departing the principles, may conduct various modifications and changes to the configuration the sensor 220. However, those variations and modifications may not depart the spirit and scope of this disclosure. For example, the outlet 406 may be omitted, and electronic component(s) in the sensor 220 may realize a power supply or a communication between the inside and the outside of the sensor 220 via a wireless transmission. As another example, the waterproof vent 407 may be omitted, and the inside of the protective housing 401 may be vacuumed, so it is not necessary to use the waterproof vent 407 to balance the pressures inside and the pressure outside the protective housing 401.

FIG. 5-A is a schematic diagram illustrating a front layout of a circuit board 500 of the sensor 220 according to some embodiments of the present disclosure. The circuit board 500 may be disposed inside the protective housing 401. The front side of the circuit board 500 may include a photosensitive detection component. In some embodiments, the circuit board 500 may include three groups of photosensitive elements, i.e., a photosensitive group on an X-axis (as shown in FIG. 5-A), a photosensitive group on a Y-axis (as shown in FIG. 5-A), and a photosensitive group for sensing radiation intensity. The photosensitive group on the X-axis may include a plurality of photosensitive elements arranged in a row along the X-axis direction. In some embodiments, the photosensitive elements of the photosensitive group on the X-axis may be parallel or not parallel to each other. In some embodiments, the photosensitive elements of the photosensitive group on the X-axis may be perpendicular or not perpendicular to the X-axis direction. The photosensitive group on the Y-axis may include a plurality of photosensitive elements arranged in a row along the Y-axis direction. In some embodiments, the photosensitive elements of the photosensitive group on the Y-axis may be parallel or not parallel to each other. In some embodiments, the photosensitive elements of the photosensitive group on the Y-axis may be perpendicular or not perpendicular to the Y-axis direction. The photosensitive elements of the photosensitive group on the X-axis and the photosensitive group on the Y-axis may measure an angle change of the sunlight and output a corresponding current signal. The photosensitive group for sensing radiation intensity may include at least one photosensitive element for determining a radiation intensity of the sunlight and outputting a corresponding current signal. The sensor 220 may determine the positional relationship between the current sunlight and the sensor 220 based on a difference between light rays incident on the photosensitive elements of the photosensitive groups at different positions.

In some embodiments, a photosensitive element may be one or more of a phototube, a photomultiplier tube, a photoresistor, a photodiode, a phototransistor, a solar cell, a silicon photocell, an infrared sensor, an ultraviolet sensor, a fiber optic sensor, a color sensor, a CCD, and a CMOS image sensor. In some embodiments, the photosensitive element of the sensor 220 may use a silicon photocell, which has similar material to a solar cell module and has a more reliable performance. The photosensitive element may be made of one or more of semiconductor materials, such as amorphous silicon, polycrystalline silicon, $CuInxGa_{(1-x)}Se2$, GaAs, CdTe, and CuInSe2 (CuInS2). The photosensitive element may be made of various materials to meet a complex operating environment.

In some embodiments, the circuit board 500 may include three groups of photosensitive elements. As shown in FIG. 5-A, the circuit board 500 may have 5 photosensitive elements 507, 508, 509, 510, and 511. The photosensitive elements 509 and 510 may form a photosensitive group on the X-axis. The photosensitive elements 507 and 508 may form a photosensitive group on the Y-axis. The photosensitive element 511 may form a photosensitive group for sensing radiation intensity. Therefore, the photosensitive elements 509 and 510 may be arranged along the X-axis direction and perpendicular to the X-axis direction. The photosensitive elements 507 and 508 may be arranged along the Y-axis direction on one side of the photosensitive elements 509 and 510 and perpendicular to the Y-axis direction. This may be used to measure solar conditions in two perpendicular axial directions. The relative position of the tracker to the sun may be determined from a signal difference between the photosensitive elements 507 and 508 and a signal difference between the photosensitive elements 509 and 510. The photosensitive element 511 for sensing radiation intensity may determine a current radiation dose of sunlight in a normal tracking, thereby determining a current exposure condition of sunlight, such as whether it is rainy, etc., and determining whether the tracking system tracks the sun normally, which may provide auxiliary information to the tracking system. As another example, if the photosensitive group on the X-axis and the photosensitive group on the Y-axis both break down, the tracking system 110 may perform tracking motion according to a photosensitive signal sampled by the photosensitive element 511 for sensing radiation intensity. In some embodiments, negative electrodes of the photosensitive elements 509, 510, 511, 508, 507 may be connected to a GND 506 (Ground, a ground end of a wire) through interfaces 501, 502, 503, 504, 505, respectively, to transmit signals via proper terminals. The positive electrode of each of the photosensitive elements 507, 508, 509, 510, and 511 may be connected to an output line to transmit an output current. In some embodiments, the photosensitive elements 507, 508, 509, 510, and 511 may output the output currents to the signal processing chip 530 on the back side of the circuit board.

Figure 6:
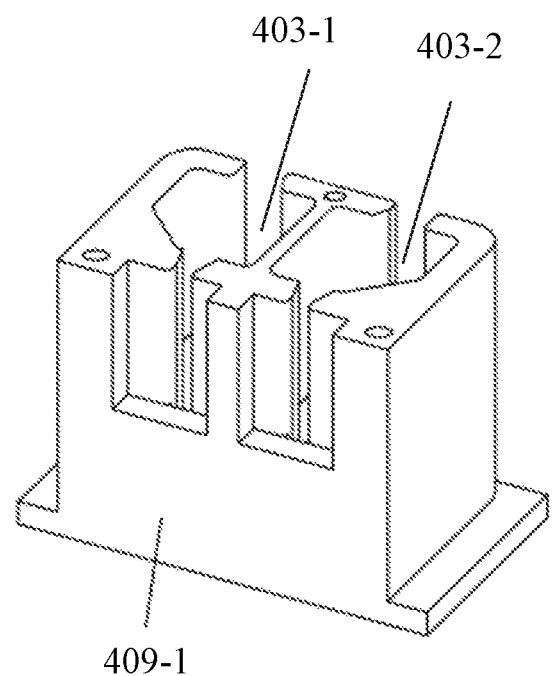
FIG. 6 is a perspective schematic diagram illustrating an optical component of a sensor according to some embodiments of the present disclosure.

FIG. 5-B is a schematic diagram illustrating a back layout of a circuit board 500 of a sensor according to some embodiments of the present disclosure. As shown in FIG. 5-B, the back side of the circuit board 500 may include a tilt angle detection component, a signal control component, a communication component, or the like. The components mounted on the back of the circuit board 500 may be omitted from direct irradiation from the radiation source, which may lower the operating temperature and increase the reliability of the sensor. The tilt angle detection component of a tilt angle chip 560 may detect an angle of a tracking bracket in real time. The tilt angle chip 560 may transmit the detected angle signal of the tracking bracket to the signal control chip 540. In some embodiments, a photosensitive element may obtain an analog current signal (e.g., a photodiode signal 520) by sampling. The photosensitive element may include one or more of a phototube, a photomultiplier tube, a photoresistor, a photodiode, a phototransistor, a solar cell, a silicon photocell, an infrared sensor, an ultraviolet sensor, a fiber optic sensor, a color sensor, a CCD, and a CMOS image sensor. For example, the photodiode may transmit an analog current signal (e.g., the photodiode signal 520) acquired by sampling to the signal processing chip 530. In some embodiments, the analog current signal may be transmitted to the signal processing chip 530 via a signal transmission chip 550. The signal processing chip 530 may include an op-amp chip. The op-amp chip may include a low power op-amp chip, a high impedance op-amp chip, a precision op-amp chip, a dual op-amp chip, or the like. In some embodiments, the signal processing chip 530 may convert the analog current signal (e.g., the photodiode signal 520) into a photosensitive signal. The signal processing chip 530 may transmit the converted photosensitive signal to a signal control chip 540. In some embodiments, the signal control chip 540 may process the photosensitive signal and the angle signal. For example, the signal control chip 540 may transmit a processed signal to a signal transmission chip 550. In some embodiments, the signal transmission chip 550 may transmit the processed signal to the controller 230. In some embodiments, the controller 230 may control a tracking motion of a tracker 110-n according to the processed signal. For example, the controller 230 may adjust the angle of a tracking bracket so that a photovoltaic module may directly face or substantially directly face the radiation source in real time FIG. 6 is a perspective schematic diagram illustrating an optical component of a sensor according to some embodiments of the present disclosure. In some embodiments, an optical component 402 may include a plurality of optical channels 403 (e.g., optical channels 403-1, 403-2, 403-3, and 403-4). For example, the optical component 402-1 may include two optical channels 403-1 and 403-2 (or the optical component 402-2 may include two optical channels 403-3 and 403-4). Each of the two optical channels 403-1 and 403-2 may correspond to one of two photosensitive elements (for example, photosensitive elements 508 and 507) in a photosensitive group of FIG. 5-A. Each of the two optical channels 403-3 and 403-4 may correspond to one of two photosensitive elements (e.g., photosensitive elements 509 and 510) in a photosensitive group of FIG. 5-A. In some embodiments, the sensor may include a plurality of optical components 402. For example, the sensor may include two optical components 402 (including optical components 402-1 and 402-2). For instance, each of the two optical components 402 (including the optical components 402-1 and 402-2) may correspond to one of the photosensitive group on the X-axis and the photosensitive group on the Y-axis in FIG. 5-A. For example, the optical channels 403-1 and 403-2 of the optical component 402-1 in FIG. 4-A may correspond to the photosensitive elements 508 and 507 of the photosensitive group on the Y-axis in FIG. 5-A, respectively. The optical channels 403-3 and 403-4 of the optical component 402-2 in FIG. 4-A may correspond to the photosensitive elements 509 and 510 of the photosensitive group on the X-axis in FIG. 5-A, respectively. In some embodiments, the optical component 402-1 may include a body 409-1 and a cover plate 410-1 (or the optical component 402-2 may include a body 409-2 and a cover plate 410-2). The body 409 (e.g., the bodies 409-1 and 409-2) may include a plurality of optical channels 403 (e.g., optical channels 403-1, 403-2, 403-3, and 403-4). A side of the body 409 may include an opening formed by the optical channels 403. The cover plate 410-1 may be connected to the body 409-1 to cover the opening on the side of the body 409-1, thereby forming a complete optical channel 403 (e.g., optical channels 403-1 and 403-2). The cover plate 410-2 may be connected to the body 409-2 to cover the opening on the side of the body 409-2, thereby forming a complete optical channel 403 (e.g., optical channels 403-3 and 403-4) as shown in FIG. 4-A. The body 409 (e.g., the body 409-1 and 409-2) may include a plurality of holes on the side having an opening. The holes may be configured to mount a cover plate 410 (e.g., the cover plates 410-1 and 410-2). In some embodiments, an optical channel 403 (e.g., the optical channels 403-1, 403-2, 403-3, and 403-4) may form a semi-closed structure due to the cover plate 410 (e.g., the cover plates 410-1 and 410-2). The optical channel 403 may transmit light in one direction because of the semi-closed structure.

Figure 7:
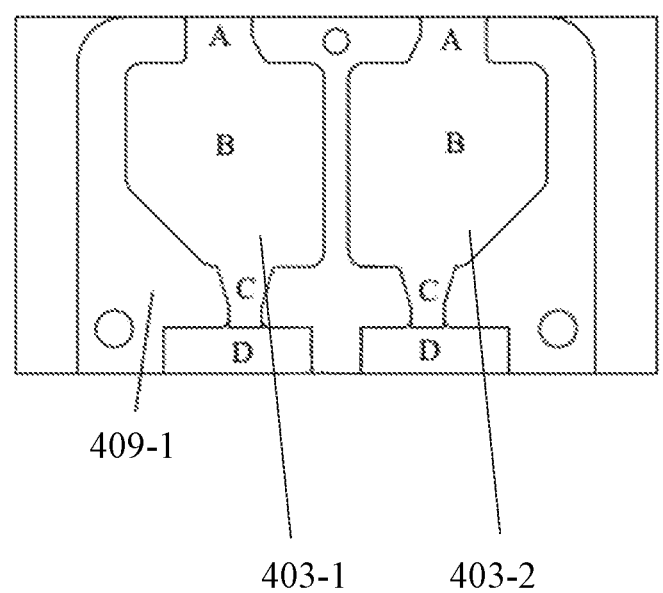
FIG. 7 is a front view illustrating an optical component of a sensor according to some embodiments of the present disclosure.

FIG. 7 is a front view illustrating an optical component of a sensor according to some embodiments of the present disclosure. In some embodiments, an optical channel 403 (for example, the optical channels 403-1, 403-2, 403-3, and 403-4) may include an accommodation groove, a light transmission hole, and a connection hole. As shown in FIG. 7, an accommodation groove D may be used to accommodate a corresponding photosensitive element in a photosensitive group in FIG. 5-A. The light transmission hole may include an upper light transmission hole A and a lower light transmission hole C. The lower light transmission hole C may be connected to the accommodation groove D. A connection hole B may establish a connection between the upper light transmission hole A and the lower light transmission hole C. In some embodiments, the accommodation groove D, the lower light transmission hole C, the connection hole B, and the upper transmission hole A may be arranged in sequence along a direction perpendicular to the surface of the photosensitive element (for example, a normal direction of the photosensitive element), so that the sunlight may pass through the optical channel 403 via the light transmission hole A to illuminate the photosensitive element.

In some embodiments, the wall of an optical channel 403 (e.g., optical channels 403-1, 403-2, 403-3, and 403-4) may include a black light absorption layer. In some embodiments, an optical component 402 (e.g., optical components 402-1 and 402-2) may be made of a black material. For example, the optical component 402 may be made of a black material that is weather resistant. The black material may absorb scattered and reflected light to avoid an influence of the scattering and reflected light on accuracy. For example, the wall of the optical channel 403 may be black. If a scattered light with an unordered angle illuminates the wall of the optical channel 403, the scattered light may be absorbed by the black wall.

In some embodiments, in an optical channel 403, the aperture of the upper transmission hole A may be larger than the aperture of the lower light transmission hole C, and the aperture of the connection hole B may be larger than the aperture of the upper transmission hole A. For example, the aperture of the upper transmission hole A may be larger than the aperture of the lower light transmission hole C, so that the optical channel 403 may increase the amount of light received by the photosensitive element, thereby improving the sensitivity of the photosensitive detection component. As another example, the aperture of the connection hole B may be larger than the aperture of the upper transmission hole A, so that a larger chamber may be formed inside the optical channel 403. If a stray light enters the chamber, it may be reflected for multiple times, which may facilitate the absorption of the stray light by the wall. The absorption of the stray light may increase the accuracy of the photosensitive detection component.

In some embodiments, the depth of an optical channel 403 (e.g., the thickness of the optical channel 403 along the normal direction of the photosensitive element) may be greater than the aperture of any part of the optical channel 403 (e.g., the upper transmission hole A, the connection hole B, the lower light transmission hole C). For example, the depth of the optical channel 403 may be greater than the aperture of each component in the optical channel 403, so that a scattered light having a large angle with the optical channel 403 may illuminate the wall of the optical channel. The scattered light line may be absorbed by the wall if the wall is black.

In some embodiments, in an optical channel 403, the cross section of the upper transmission hole A may be a rectangle with a long side and a short side. The cross section of the lower light transmission hole C may be a rectangle with a long side and a short side. In some embodiments, the short side of an optical channel 403 corresponding to the photosensitive group on Y-axis in FIG. 5-A may extend along the Y-axis direction. The short side of an optical channel 403 corresponding to the photosensitive group on X-axis in FIG. 5-A may extend along the X-axis direction.

In some embodiments, the center of an upper transmission hole A may have an offset to the center of a lower light transmission hole C. In some embodiments, two optical channels 403 corresponding to optical component(s) 402 in a photosensitive group may form an axisymmetric structure. For example, the centers of two upper transmission holes A of two optical channels 403 (for example, optical channels 403-1 and 403-2, or optical channels 403-3 and 403-4) may have offsets to centers of a lower light transmission holes C in two directions. For example, in the optical component 402-1 in FIG. 4-A, the optical channel 403-2 may correspond to the photosensitive element 507 in the photosensitive group on Y-axis in FIG. 5-A. In the optical channel 403-2, the center of the upper transmission hole A may have an offset along a positive direction on the Y-axis with respect to the center of the lower light transmission hole C. The optical channel 403-1 may correspond to the photosensitive element 508 in the photosensitive group on Y-axis in FIG. 5-A. In the optical channel 403-1, the center of the upper transmission hole A may have an offset along a negative direction on the Y-axis with respect to the center of the lower light transmission hole C. As another example, in the optical component 402-2 in FIG. 4-A, the optical channel 403-3 may correspond to the photosensitive element 509 in the photosensitive group on X-axis in FIG. 5-A. In the optical channel 403-3, the center of the upper transmission hole A may have an offset along a positive direction on the X-axis with respect to the center of the lower light transmission hole C. The optical channel 403-4 may correspond to the photosensitive element 510 in the photosensitive group on X-axis in FIG. 5-A. In the optical channel 403-4, the center of the upper transmission hole A may have an offset along a negative direction on the X-axis with respect to the center of the lower light transmission hole C.

Figure 8:
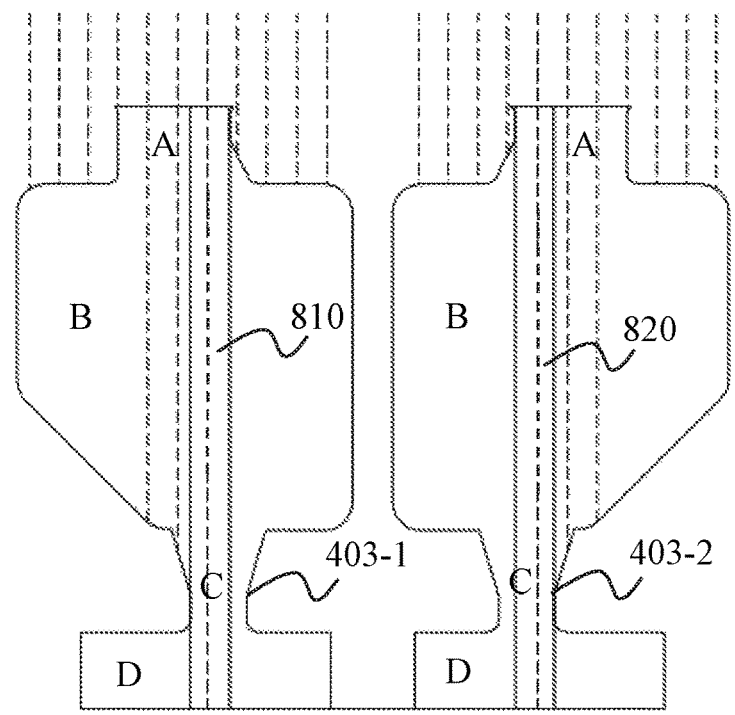
FIG. 8 is an exemplary diagram illustrating a sensor including an optical component that directly faces a radiation source according to some embodiments of the present disclosure.

In some embodiments, a line connecting the center of an upper transmission hole A and the center of a lower light transmission hole C may form an angle with the surface of a photosensitive element. The angle may increase the accuracy of the photosensitive detection component as shown in FIG. 8. FIG. 8 is an exemplary diagram illustrating a sensor including an optical component directly facing a radiation source according to some embodiments of the present disclosure. In some embodiments, when the photosensitive detection component directly faces the radiation source (e.g., a beam of parallel sunlight illuminates the photosensitive detection component vertically), light receiving regions 810 and 820 of two photosensitive elements corresponding to two optical channels 403 (including the optical channels 403-1 and 403-2) of the optical component 402-1 may be the same. For example, if the radiation source is the sun, the sunlight may have a certain light intensity. In such cases, the current generated by the photosensitive elements may be the same if the light receiving regions are the same.

Figure 9:
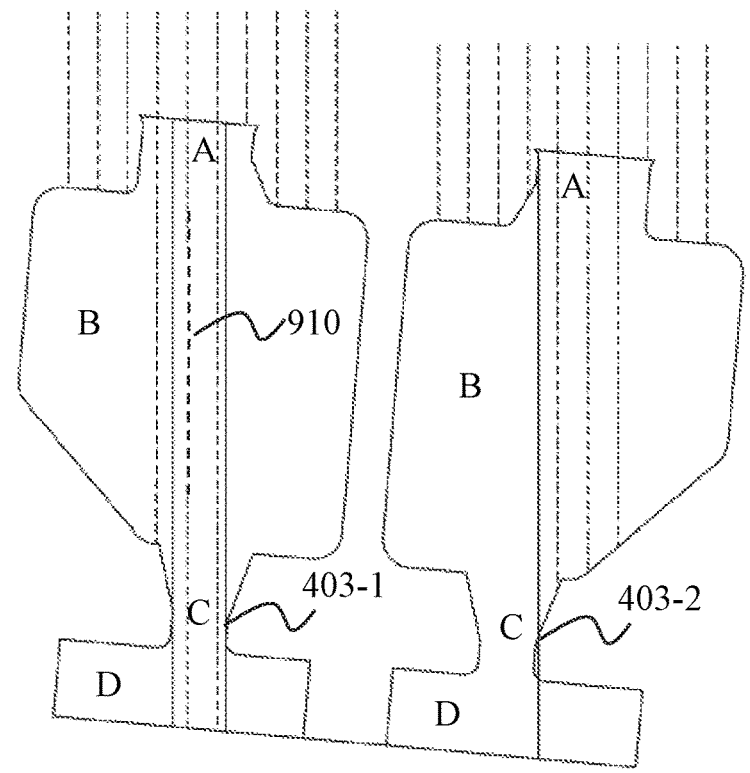
FIG. 9 is an exemplary schematic diagram illustrating a sensor including an optical component that has a certain angle with a radiation source according to some embodiments of the present disclosure.

FIG. 9 is an exemplary schematic diagram illustrating a sensor including an optical component that has an angle with respect to a radiation source according to some embodiments of the present disclosure. In some embodiments, if there is an angle between the normal of a photosensitive detection component and the radiation source (e.g., there is an angle between a beam of parallel sunlight and the normal of the photosensitive detection component), the light receiving region 910 of the photosensitive element corresponding to the left optical channel (e.g., 403-1) may be larger than the light receiving region of the photosensitive element corresponding to the right optical channel (e.g., 403-2) because of the positional relationship between an upper transmission hole and a lower light transmission hole (e.g., the center of the upper transmission hole A may have an offset to the center of the lower light transmission hole C) as shown in FIG. 9. For example, the photosensitive element corresponding to the right optical channel (e.g., 403-2) may have no light receiving region (e.g., the sunlight may be unable to pass through the optical channel (e.g., 403-2) to illuminate the corresponding photosensitive element). In some embodiments, if a photosensitive detection component is titled, the light receiving region of a corresponding photosensitive element in the right optical channel (e.g., 403-2) may be reduced because of the tilt angle, and the light receiving region of a corresponding photosensitive element in the left optical channel (e.g., 403-1) may be increased because of the tilt angle. The difference between the light receiving region of the photosensitive element corresponding to the left optical channel (e.g., 403-1) and the light receiving region of the photosensitive element corresponding to the right optical channel (e.g., 403-2) may be increased rapidly. The increased difference may increase the accuracy of the photosensitive sensor. In some embodiments, the accuracy of the photosensitive detection component may be increased to 0.1°.

Figure 10:
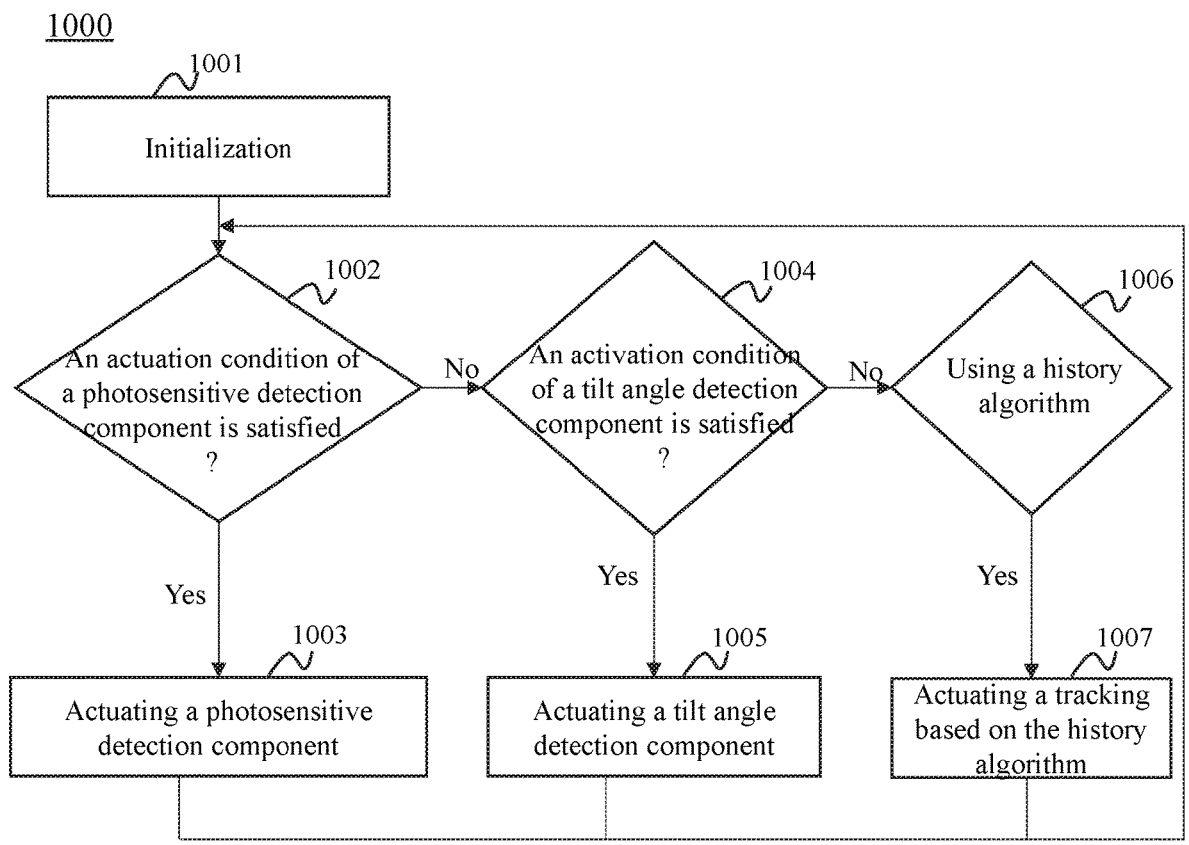
FIG. 10 is a flow chart illustrating an exemplary process for tracking control according to some embodiments of the present disclosure.

FIG. 10 is a flow chart illustrating an exemplary process for tracking control according to some embodiments of the present disclosure. In 1001, the controller 230 may initialize a tracker 110-*n*. In some embodiments, the initialization of the tracker 110-*n* may include an initialization of a program parameter. In some embodiments, the program parameter may include an angle of a tracking bracket of the tracker 110-*n*. The initialization of the program parameter may be an initialization of an angle parameter of the tracking bracket. For example, during the actuation of the tracking system 110, the angle of the tracking bracket of tracker 110-*n* may be initialized so that the tracking bracket is at an initial position. For example, the initial position may be a position at which a photovoltaic module is parallel to the ground or has a certain tilt angle.

In 1002, the controller 230 may determine whether the tracker 110-*n* satisfies an actuation condition of the photosensitive detection component 330. The actuation condition of the photosensitive detection component 330 may include a weather condition (e.g., in a sunny day), a device condition (e.g., the photosensitive detection component 330 has no malfunction), or a condition relating to whether the tracker 110-*n* operates in an angle detection range of the photosensitive detection component 330. If the controller 230 determines that the actuation condition of the photosensitive detection component 330 is satisfied, the process may proceed to 1003, and the controller 230 may actuate a tracking based on the photosensitive detection component 330. In some embodiments, the actuation of a tracking based on the photosensitive detection component 330 may refer to using a tracking mode in which the tracking is performed based on a sampling signal of the photosensitive detection component 330. The tracking mode using the photosensitive detection component 330 may be a mode in which the tracker 110-*n* has a tracking motion according to a photosensitive signal acquired by the photosensitive detection component 330. For example, the controller 230 may transmit a control instruction to a driving device 250 according to the photosensitive signal. According to the control instruction, the driving device 250 may control the operation of the motor such that the tracking bracket and/or component(s) fixed on the tracking bracket (e.g., photovoltaic module, one or more sensor, etc.) may track the radiation source. In some embodiments, the tracking of the radiation source may make the photovoltaic module directly face or substantially directly face the radiation source (e.g., the sun, etc.) in real time. In some embodiments, the controller 230 may continue determining whether the tracker 110-*n* operates in the angle detection range of the photosensitive detection component 330 or whether the actuation condition of the photosensitive detection component 330 is satisfied. For example, the controller 230 may perform operation 1002 and subsequent operation(s).

If the controller 230 determines that the actuation condition of the photosensitive detection component 330 is not satisfied, for example, when the controller 230 determines that the photosensitive detection component 330 breaks down or when the illumination is weak (for example, in a cloudy day), the process may proceed to 1004, and the controller 230 may determine whether an actuation condition of the tilt angle detection component is satisfied. In some embodiments, the controller 230 may transmit a notification indicating that the photosensitive detection component 330 breaks down to the server 130 or the terminal device 150. In some embodiments, the server 130 or the terminal device 150 may select a tracking mode of the tracking system 110 according to the notification, and the controller 230 may control the tracking based on the selected tracking mode. For example, the server 130 or the terminal device 150 may select a tracking mode in which the tracking is controlled based on the tilt angle detection component 340. In some embodiments, the server 130 or the terminal device 150 may select a malfunction solution based on the notification. For example, the server 130 or the terminal device 150 may perform a device reset based on the malfunction type, or send information to a maintenance staff member for manual repair. The actuation condition of the tilt angle detection component 340 may include a weather condition (e.g., without wind), or a device condition (e.g., the tilt angle detection component 340 has no malfunction), or the like. If the controller 230 determines that the tracker 110-*n* satisfies the actuation condition of the tilt angle detection component 340, the process may proceed to 1005, and the controller 230 may actuate a tracking based on the tilt angle detection component 340. In some embodiments, the actuation of a tacking based on the tilt angle detection component 340 may refer to using a tracking mode in which the tracking is controlled using a sampling signal of the tilt angle detection component 340. The tracking mode using the tilt angle detection component 340 may be a tracking mode in which the tracker 110-*n* has a tracking motion according to an angle signal acquired by the tilt angle detection component 340. For example, the controller 230 may send a control instruction to the driving device 250 according to the angle signal, and the driving device 250 may control the operation of the motor according to the control instruction, such that the tracking bracket and/or component(s) fixed on the tracking bracket (e.g., a photovoltaic module, one or more sensors, etc.) may track a radiation source. In some embodiments, the controller 230 may continue determining whether the tracker 110-*n* operates in an angle detection range of the photosensitive detection component 330 or whether the actuation condition of the photosensitive detection component 330 is satisfied. For example, the controller 230 may perform operation 1002 and subsequent operation(s).

If the controller 230 determines that the tracker 110-*n* does not satisfy the actuation condition of the tilt angle detection component 340, for example, when the controller determines that the tilt angle detection component 340 breaks down, the process may proceed to 1006, and the controller 230 may obtain a historical algorithm stored in the storage 240. In some embodiments, the controller 230 may transmit a notification to the server 130 or the terminal device 150 to indicate that the tilt angle detection component 340 breaks down. In some embodiments, the server 130 or the terminal device 150 may select a tracking mode of the tracking system 110 based on the notification. For example, server 130 or terminal device 150 may select a tracking control mode based on the historical algorithm. In some embodiments, the server 130 or the terminal device 150 may select a malfunction solution based on the notification. The historical algorithm may perform a calculation based on historical data. The historical data may include the count of revolutions of a motor per operation recorded by an encoder, a start time of the motor, an operation angle of the tracking bracket, or the like, or any combination thereof. The encoder may determine the count of revolutions of the motor. In some embodiments, the count of revolutions of the motor may be determined by a counter. The encoder may include an optical encoder, a magnetic encoder, or the like. In some embodiments, if the tracking bracket operates normally, the encoder may record and store the start time of the motor operation, the count of revolutions of each operation of the motor, and the operation angle of the tracking bracket in real time. In some embodiments, the historical algorithm may generate an angle curve based on the historical data (e.g., time, the angle of the tracking bracket). The angle curve may be a tracking trajectory curve of the tracking bracket. In some embodiments, the tracking trajectory curve may be obtained by recording the state of the tracking bracket in each tracking motion (for example, recording the tracker's moving trajectory). For example, each tracking motion may include an angle of the tracking bracket in each rotation. The absolute value of the angle in each rotation may be greater than or equal to 0.05°. For example, the angle in each rotation may include ±0.1°, ±0.2°, ±0.3°, ±0.4°, ±0.5°, ±0.6°, ±0.7°, ±0.8°, ±0.9°, ±1°, ±2°, or the like.

In 1007, the controller 230 may actuate a tracking based on the historical algorithm. In some embodiments, the actuation of the tracking based on the historical algorithm may be referred to using a tracking mode in which the tracking is controlled by the historical algorithm. The tracking mode using the historical algorithm may be a mode in which the tracker 110-$n$ has a tracking motion according to a tracking trajectory of the historical algorithm. For example, the controller 230 may send a control instruction to the driving device 250 according to the tracking trajectory, and the driving device 250 may control the operation of the motor according to the control instruction, such that the tracking bracket and/or component(s) fixed on the tracking bracket (e.g., a photovoltaic module, one or more sensors, etc.) may track a radiation source. In some embodiments, the controller 230 may control the tracker 110-$n$ to perform a tracking motion according to an angle curve determined by the historical algorithm. For example, if the controller 230 determines that the actuation conditions of the photosensitive detection component 330 and the tilt angle detection component 340 are not satisfied, or the controller 230 determines that the photosensitive detection component 330 and the tilt angle detection component 340 both break down, the controller 230 may determine a target tracking angle of the tracking bracket based on historical data using the historical algorithm. In some embodiments, the controller 230 may transmit a notification to the server 130 or the terminal device 150 to indicate that the photosensitive detection component 330 and the tilt angle detection component 340 both break down. In some embodiments, the server 130 or the terminal device 150 may select a tracking mode of the tracking system 110 based on the notification. For example, the server 130 or the terminal device 150 may select a tracking control mode based on the historical algorithm. In some embodiments, the server 130 or the terminal device 150 may select a malfunction solution based on the notification. For example, according to an angle curve, the driving device 250 may drive the tracking bracket to move to a corresponding angle in real-time. In some embodiments, the controller 230 may continue determining whether the tracker 110-$n$ operates in the angle detection range of the photosensitive detection component 330 or whether the actuation condition of the photosensitive detection component 330 is satisfied. For example, the controller 230 may perform operation 1002 and subsequent operation(s).

In some embodiments, a processing engine of server 130 may control one or more trackers 110-$n$ of the tracking system 110. In some embodiments, after a first installation of a tracker 110-$n$, if the processing engine determines that an angle of the tracking bracket is significantly different from a theoretical angle of a radiation source (e.g., the sun), operation 1002 and/or operation 1003 of the control process 1000 may be skipped, and the controller 230 may perform operation 1004. If the controller 230 determines that the actuation condition of the tilt angle detection component 340 is satisfied, the controller 230 may actuate the tilt angle detection component 340. In some embodiments, the actuation of a tacking based on the tilt angle detection component 340 may refer to using a tracking mode in which tracking is controlled using a sampling signal of the tilt angle detection component 340. In some embodiments, after the actuation of a tacking based on the tilt angle detection component 340, the controller 230 may continue determining whether the tracker 110-$n$ operates in the angle detection range of the photosensitive detection component 330 or whether the actuation condition of the photosensitive detection component 330 is satisfied. For example, the controller 230 may perform operation 1002 and subsequent operation(s).

In some embodiments, the terminal device 150 may control one or more trackers 110-$n$ of the tracking system 110. In some embodiments, the terminal device 150 may determine that an angle of the tracking bracket deviates from a theoretical angle of a radiation source, operation 1002 and/or operation 1003 of the control process 1000 may be skipped, and the controller 230 may perform operation 1004. If the controller 230 determines that the actuation condition of the tilt angle detection component 340 is satisfied, the controller 230 may actuate the tilt angle detection component 340. In some embodiments, the actuation of a tacking based on the tilt angle detection component 340 may refer to using a tracking mode in which tracking is controlled using a sampling signal of the tilt angle detection component 340. For example, the terminal device 150 may directly control the tracking system 110 to perform operation 1005. In some embodiments, after the actuation of a tacking based on the tilt angle detection component 340, the controller 230 may continue determining whether the tracker 110-$n$ operates in the angle detection range of the photosensitive detection component 330 or whether the actuation condition of the photosensitive detection component 330 is satisfied. For example, the controller 230 may perform operation 1002 and subsequent operation(s).

It should be noted that the description above about the control process of the tracking system is provided for illustration purposes, and not intended to limit the present disclosure within the scope of the disclosed embodiments. For persons having ordinary skills in the art, upon understanding the principle of the process, modifications and variations may be conducted on the control process of the tracking system without departing the principle. However, those variations and modifications may not depart the spirit and scope of this disclosure. For example, operations 1002 and/or 1003 may be skipped, and the controller 230, the processing engine of the server 130, or the terminal device 150 may directly actuate the tilt angle detection component 340. As another example, operation 1006 may be omitted, and the controller 230 may directly control the tracking system to perform tracking motion based on the historical algorithm.

The basic concepts have been described above, and it is obvious that the above detailed disclosure is merely exemplary for those skilled in the art and does not constitute a limitation on the present application. Although not explicitly illustrated herein, those skilled in the art may make various modifications, improvements, and corrections to the present application. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present application may be performed entirely by hardware, may be performed entirely by software (including firmware, resident software, microcode, etc.), or may be performed by a combination of hardware and software. Each of the above hardware or software may be described as "data bloc," "module," "engine," "unit," "component," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. The propagated signal may have a variety of manifestations, including electromagnetic forms, optical forms, etc., or suitable combinations of them. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figures, or description thereof for the purpose of streamlining the disclosure aiding in the understanding of one or more of the various embodiments. However, this disclosure method does not mean that the features required by the subject of the application are more than those mentioned in the claims. Rather, claim subject matter lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each patent, patent application, patent application publication and other materials cited herein, such as articles, books, instructions, publications, documents, articles, etc., are hereby incorporated by reference in their entirety. Application history documents that are inconsistent or conflicting with the contents of the present application are excluded, and documents (currently or later attached to the present application) that limit the widest range of the scope of the present application are also excluded. It is to be noted that if the description, definition, and/or terminology used in the appended application of the present application is inconsistent or conflicting with the contents described in this application, the description, definition and/or terminology may be subject to the present application.

At last, it should be understood that the embodiments described in the present application are merely illustrative of the principles of the embodiments of the present application. Other modifications that may be employed may be within the scope of the application. Thus, by way of example, but not of limitation, alternative configurations of the embodiments of the application may be utilized in accordance with the teachings herein. Accordingly, embodiments of the present application are not limited to the embodiments that are expressly introduced and described herein.

What is claimed is:

1. A sensor comprising:
   a protective housing;
   an optical component, wherein the optical component comprises:
      a cover plate;
      a positioning hole of the cover plate; and
      a light transmission hole;
   a control component;
   an interface component; and
   a circuit board mounted within the protective housing, the circuit board comprising a plurality of detection components, wherein the plurality of detection components comprise a photosensitive detection component and a tilt angle detection component.

2. The sensor of claim 1, wherein the photosensitive detection component is mounted on a side of the circuit board facing a radiation source, and the tilt angle detection component is mounted on a side of the circuit board away from a radiation source.

3. The sensor of claim 1, further comprising a communication component.

4. The sensor of claim 1, wherein the protective housing further comprises:
   an outlet;
   a waterproof vent; and
   a circuit board positioning and placement interface for positioning the circuit board.

5. The sensor of claim 4, wherein the outlet comprises a four core outdoor shielded cable.

6. The sensor of claim 4, wherein the protective housing comprises tempered glass.

7. The sensor of claim 1, wherein the light transmission hole further comprises an upper opening and a lower opening, and the upper opening is larger than the lower opening.

8. The sensor of claim 1 further comprising at least two optical components, wherein the at least two optical components are arranged vertically.

9. The sensor of claim 8, wherein the at least two optical components comprise a black weather resistant material.

10. The sensor of claim 1, wherein the photosensitive detection component comprises at least five photosensitive elements, and the at least five photosensitive elements comprise:
    at least one photosensitive element for sensing radiation intensity; and
    at least two photosensitive groups, wherein each photosensitive group comprises at least two photosensitive elements.

11. The sensor of claim 10, wherein the at least two photosensitive groups are arranged vertically.

12. A system, comprising:
    a photovoltaic module; and
    a tracker, the tracker comprising a sensor, the sensor comprising a photosensitive detection component, a tilt angle detection component, and an optical component, wherein the optical component comprises:
       a cover plate;
       a positioning hole of the cover plate; and
       a light transmission hole.

13. A method, comprising:
    determining whether a photovoltaic module operates within an angle detection range of a photosensitive detection component;
    in response to a determination that the photovoltaic module operates within the angle detection range of the photosensitive detection component, determining whether an actuation condition of the photosensitive detection component is satisfied;
    in response to a determination that the actuation condition of the photosensitive detection component is satisfied, actuating the photosensitive detection component;
    in response to a determination that the actuation condition of the photosensitive detection component is not satisfied, actuating a tilt angle detection component;
    determining whether the photosensitive detection component breaks down; and
    in response to a determination that the photosensitive detection component breaks down, actuating the tilt angle detection component to track a radiation source.

14. The method of claim 13, further comprising:
    recording a moving trajectory of a tracker.

15. The method of claim 14, further comprising:
    in response to a determination that the photovoltaic module does not operate within the angle detection range of the photosensitive detection component, actuating the tilt angle detection component.

16. The method of claim 14, further comprising:
    determining whether the tilt angle detection component breaks down; and
    in response to a determination that the tilt angle detection component breaks down, tracking a radiation source using the moving trajectory of the tracker.

17. The method of claim 14, further comprising:
    determining whether the tilt angle detection component and the photosensitive detection component both break down;
    in response to a determination that the tilt angle detection component and the photosensitive detection component both break down, tracking a radiation source using the moving trajectory of the tracker.

18. The method of claim 13, further comprising:
    determining whether the tilt angle detection component breaks down; and
    in response to a determination that the tilt angle detection component breaks down, actuating the photosensitive detection component to track a radiation source.

* * * * *